United States Patent [19]
Hopkins et al.

[11] Patent Number: 6,113,800
[45] Date of Patent: Sep. 5, 2000

[54] TREATMENT PROCESS FOR RECOVERING COMPONENTS OF A FLOAT MATERIAL FROM WASTE WATER

[75] Inventors: Matthew B. Hopkins, Kennesaw; Robert J. DeRosa, Marietta, both of Ga.; William D. Shermer, Ballwin, Mo.

[73] Assignee: Novus International, Inc., St. Louis, Mo.

[21] Appl. No.: 09/121,478

[22] Filed: Jul. 23, 1998

Related U.S. Application Data

[63] Continuation-in-part of application No. 08/787,792, Jan. 23, 1997, Pat. No. 5,980,754, which is a continuation-in-part of application No. 08/599,479, Jan. 23, 1996, Pat. No. 5,658,462.

[51] Int. Cl.[7] .............................. C02F 1/24; C02F 11/00; C02F 1/40; C02F 11/12; C11B 13/00
[52] U.S. Cl. .......................... 210/703; 210/704; 210/708; 210/712; 210/734; 210/737; 210/738; 210/768; 210/783; 210/202; 210/205; 210/400; 530/412; 530/427; 530/859; 426/417; 426/478; 426/490; 426/495; 554/8; 554/20; 554/23
[58] Field of Search .................................. 210/703, 704, 210/708, 712, 737, 738, 734, 774, 783, 768, 400, 205, 202; 530/412, 427, 859; 426/417, 478, 490, 495; 554/8, 20, 23

[56] References Cited

U.S. PATENT DOCUMENTS

| | | |
|---|---|---|
| Re. 31,185 | 3/1983 | Greenfield et al. . |
| 3,338,931 | 8/1967 | Lyon . |
| 3,352,841 | 11/1967 | Lyon . |
| 3,352,842 | 11/1967 | Lyon . |
| 3,519,662 | 7/1970 | Gruver, Jr. . |
| 3,899,419 | 8/1975 | Emanuel . |
| 3,940,334 | 2/1976 | Miyazawa . |
| 3,947,327 | 3/1976 | Greenfield et al. . |
| 4,007,094 | 2/1977 | Greenfield et al. . |
| 4,013,516 | 3/1977 | Greenfield et al. . |

(List continued on next page.)

FOREIGN PATENT DOCUMENTS

| | | |
|---|---|---|
| 0013659 | 7/1980 | European Pat. Off. . |
| 2901261 | 7/1980 | Germany . |
| 3212120 A1 | 10/1983 | Germany . |
| 4228096 A1 | 3/1994 | Germany . |
| 8060179 | 5/1996 | Japan . |
| 1098716 | 1/1968 | United Kingdom . |
| WO 97/26972 | 1/1997 | WIPO . |

OTHER PUBLICATIONS

Lau, Paul L., "Drying of Alum Sludge Using the Carver–Greenfield Process", Contra Costa Water District, Concord, California, publication date unknown.

"The Carver–Greenfield Process; Dehydro–Tech Corporation; Application Analysis Report", U.S. Environmental Protection Agency; EPA Document No. EPA/540/AR–92/002, Aug. 1992.

(List continued on next page.)

*Primary Examiner*—Thomas M. Lithgow
*Attorney, Agent, or Firm*—Senniger, Powers, Leavitt & Roedel

[57] ABSTRACT

A treatment process for recovering protein, fatty and water component products from a float material produced by a waste water treatment system, wherein the protein and fatty components possess improved stability and are suitable for further processing for inclusion in various products, such as animal feed. The recovered water component can also be further processed before discharge into a sewer system.

60 Claims, 8 Drawing Sheets

U.S. PATENT DOCUMENTS

| | | |
|---|---|---|
| 4,081,375 | 3/1978 | Deal et al. . |
| 4,137,167 | 1/1979 | Kenyon et al. . |
| 4,140,636 | 2/1979 | Nakashima . |
| 4,151,093 | 4/1979 | Krofta . |
| 4,153,550 | 5/1979 | Lautrette . |
| 4,232,051 | 11/1980 | Hinds, Jr. et al. . |
| 4,276,115 | 6/1981 | Greenfield et al. . |
| 4,282,256 | 8/1981 | Evich et al. . |
| 4,338,337 | 7/1982 | Frankl . |
| 4,340,487 | 7/1982 | Lyon . |
| 4,354,934 | 10/1982 | Kohonen . |
| 4,361,590 | 11/1982 | Wojcik . |
| 4,377,479 | 3/1983 | Pierson . |
| 4,475,453 | 10/1984 | Davis . |
| 4,668,391 | 5/1987 | Ottens . |
| 4,686,930 | 8/1987 | Ritz . |
| 4,756,092 | 7/1988 | Anderson et al. . |
| 4,787,972 | 11/1988 | Stubblebine . |
| 4,810,257 | 3/1989 | Lau et al. . |
| 4,812,234 | 3/1989 | Perchthaler et al. . |
| 4,842,749 | 6/1989 | Cox . |
| 4,961,858 | 10/1990 | Spei et al. . |
| 4,966,733 | 10/1990 | Fernando et al. . |
| 4,981,599 | 1/1991 | Stewart, Jr. . |
| 5,030,359 | 7/1991 | Castrantas et al. . |
| 5,053,140 | 10/1991 | Hurst . |
| 5,074,199 | 12/1991 | Miller . |
| 5,133,879 | 7/1992 | Tittanen . |
| 5,173,190 | 12/1992 | Picek . |
| 5,174,903 | 12/1992 | Miller . |
| 5,186,817 | 2/1993 | Paspek et al. . |
| 5,200,085 | 4/1993 | Rudolf et al. . |
| 5,253,567 | 10/1993 | Gunawardena . |
| 5,286,386 | 2/1994 | Darian et al. . |
| 5,372,724 | 12/1994 | Ahmed . |
| 5,413,720 | 5/1995 | Miller . |
| 5,458,780 | 10/1995 | Evans . |
| 5,458,789 | 10/1995 | Dickerson et al. . |
| 5,543,058 | 8/1996 | Miller . |
| 5,759,568 | 6/1998 | Mosley, Sr. . |

OTHER PUBLICATIONS

"Polyhance AE 1706", Product Information Sheet from WaCon Incorporated of Atlanta, Georgia, publication date unknown, but believed to be prior to May 10, 1989.

"The Smell of Success in Manure", Fertilizer International No. 327, pp. 15–17; Nov. 1993.

Declaration of Matthew B. Hopkins and Robert J. DeRosa signed on May 14, 1997.

"The Komline–Sanderson Gravity Belt Thickener for Sludge/Slurry Volume Reduction. Gravabelt", Product Sheet from Komline–Sanderson of Peapack, New Jersey, Bulletin No. KSB–160–9007, publication date unknown.

"Three Important Reasons To Choose The Klampress", Product Information Sheet from Ashbrook–Simon–Hart, Houston Texas, publication date unknown.

"Belt Filter Press—Dewatering Technology", Product Information Sheet from Phoenix Process Equipment Co., Louisville, Kentucky, publication date unknown.

Process Flow Sheet, "WSI Protein Fat Separator", supplemental to the May 15, 1997 Declaration.

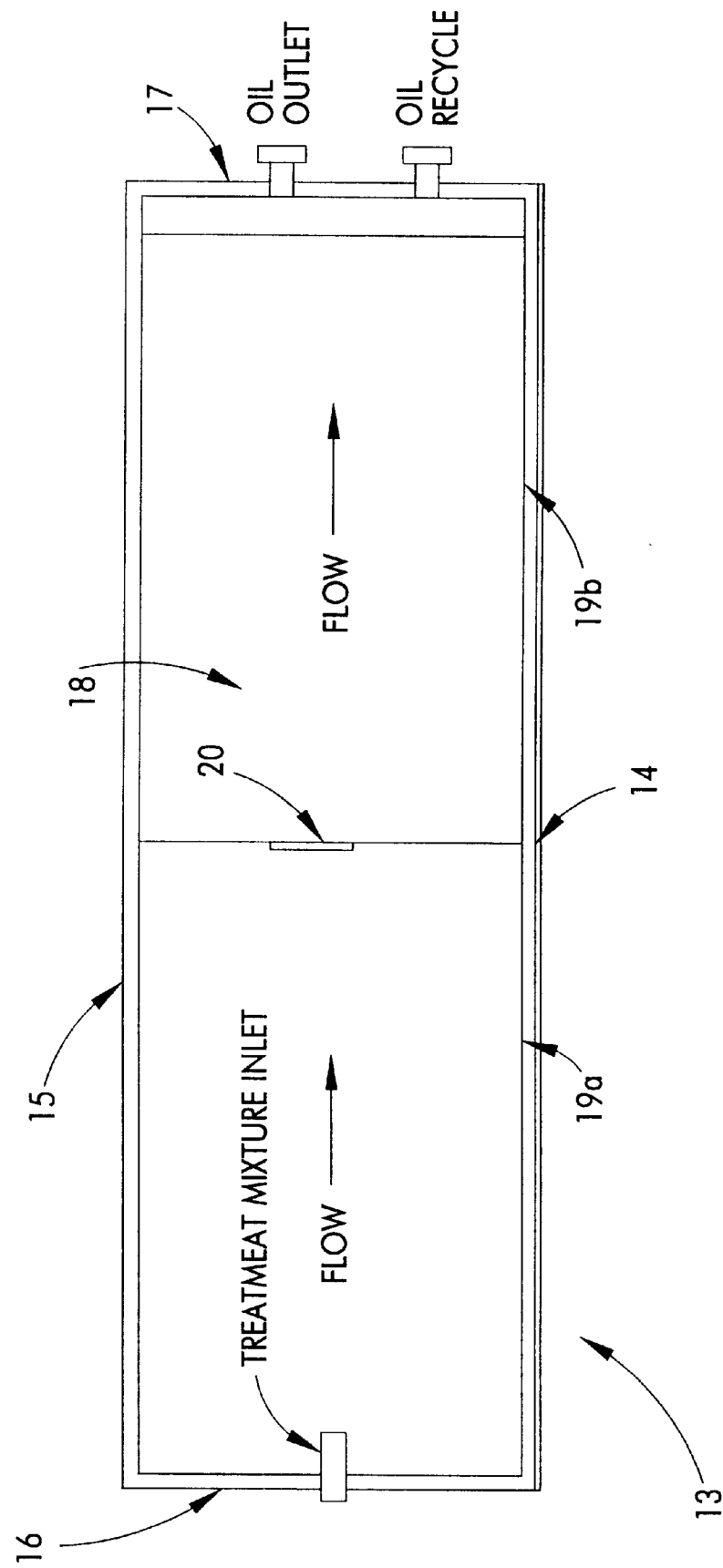

TREATMENT PROCESS FOR RECOVERING COMPONENTS OF A FLOAT MATERIAL FROM WASTE WATER

RELATED APPLICATIONS

This is a continuation-in-part of application Ser. No. 08/787,792, filed Jan. 23, 1997, (now U.S. Pat. No. 5,980,754) which is a continuation-in-part Ser. No. 08/599,479, filed Jan. 23, 1996 of U.S. Pat. No. 5,658,462.

BACKGROUND OF THE INVENTION

The present invention relates generally to a process for recovering the protein, fatty and water components of a float material which is produced from a waste water treatment system. More specifically, this invention relates to a treatment process for separating and recovering as products the protein and fat components to provide an industrial plant with increased efficiency and profitability with regard to the by-products generated by its waste water treatment system.

Most cities and counties have enacted requirements for industries which discharge water into the municipal sewer systems. These municipalities generally require the waste water to meet certain standards before being discharged, and these standards usually relate to the level of pollutants which interfere with the efficient operation of the municipal waste water treatment facility.

Waste water which contains materials having a high biochemical oxygen demand, total suspended solids and ammonia increase the treatment cost to the city or county. The term "biochemical oxygen demand" ("BOD") refers to the quantity of oxygen utilized in the biochemical oxidation of organic matter; and the term "total suspended solids" ("TSS") refers to the total suspended solids which float on the surface of, or are suspended in, waste water and which are removable by filtering.

In some instances, a surcharge may be levied on an industrial plant that produces waste water which does not meet the standards as established by the municipality. For example, these standards may prohibit waste water containing greater than 300 mg/liter of BOD, 300 mg/liter of TSS, and/or 18 mg/liter of ammonia. Cities and counties may also prohibit industrial plants from discharging waste water having an oil, grease and fat ("FOG") concentration greater than 150 mg/liter.

A city or county also has the authority to revoke an industrial plant's waste water discharge permit if that plant continues to discharge waste water which does not meet the standards set by that city or county. Therefore, an industrial plant must effectively treat its waste water to reduce the level of pollutants and thereby meet such standards.

An effective waste water treatment process for an industrial plant should cause the solid organic and inorganic matter to flocculate and form a sludge cake. This sludge cake accumulates to a certain thickness and is then separated from the liquid portion of the waste water and sent to a rendering plant for further processing. If the resulting sludge cake is under 18% solids, the rendering plant may impose a surcharge because sludge with a high percentage of water is more expensive for the rendering plant to process.

One method of treating waste water from an industrial plant is disclosed in Stewart U.S. Pat. No. 4,981,599. This process results in the formation of a sludge cake on top of the waste water. The sludge cake is removed, and the treated waste water is discharged into the sewer system.

However, the sludge cake (also generally referred to as a float material) produced by the Stewart process is not ideally suited for subsequent treatment at a rendering plant because (1) the water content of the float material is higher than desired and (2) the float material is comprised of fatty and protein components which desirably should be separated from the water component.

Therefore, a need exists for a process which can be used to separate the protein, fatty and water components of a float material produced by a waste water treatment system. Additionally, this process should provide protein and fatty component products with a high percentage of solids (i.e. a low percentage of water content).

SUMMARY OF THE INVENTION

Among the objects of the present invention, therefore, is the provision of a process for treating a float material obtained from a waste water treatment system or other industrial process; the provision of such a treatment process wherein a carrier material is used to form a treatment mixture with the float material; the provision of such a process wherein a suitable carrier material is used such that a solvent removal step, which is typical for waste treatment processes that employ conventional organic solvents, is not necessary; the provision of such a process wherein the protein, fatty and water components of the float material are separated; the provision of such a process wherein the protein and fatty components are separated and recovered as products having a low water content; the provision of such a process wherein the water component product may be recycled or discharged into a sewer system; the provision of such a process wherein the stability of the protein and fatty products is substantially improved; and, the provision of such a process which does not employ flash evaporation or other process steps designed to evaporate water.

Generally, therefore, the present invention is directed to a process for the treatment of a float material comprising a protein component, a fatty component and a water component. The process comprises forming a hot treatment mixture by mixing a carrier material and the float material, the mixture having a solids content ranging from about 2 to about 20 weight percent, and the mixture being heated to a temperature sufficient to liquefy fats, oils and greases which are present. A flocculating agent is added to the hot treatment mixture to form a flocculated mixture, and then the mixture is separated into a protein product, a fatty product and a water product.

The present invention is further directed to a process for the recovery of a protein product and a fatty product from waste water comprising a protein component, a fatty component and a water component. The process comprises aerating waste water in a flotation zone in the presence of a flocculating agent to produce a float material at an upper surface of an underlying waste water phase, and then separating said float material from the underlying waste water phase. The float material is stabilized by the addition of an antioxidant. A treatment mixture comprising the stabilized float material and a carrier material is formed, the treatment mixture being heated to a temperature of less than about 99° C. The treatment mixture is then separated into a protein product, a fatty product and a water product.

The present invention is still further directed to a process for the treatment of a float material comprising a protein component, a fatty component and a water component. The process comprises forming a hot treatment mixture by mixing a carrier material and the float material, the temperature of said mixture ranging from about 77° C. to about 93° C. The hot treatment mixture is separated into a protein component product, a fatty component product and a water component product by feeding the hot mixture onto a belt filter, and said belt filter comprising a non-corroding, non-deforming mesh belt.

The present invention is still further directed to a process for the treatment of a float material comprising a protein component, a fatty component and a water component. The process comprising forming a treatment mixture by mixing a carrier material and the float material, the treatment mixture being heated to a temperature which is sufficient to liquefy fats, oils and greases which are present. The treatment mixture is passed through a plug flow reactor and then separated into a protein product, a fatty product and a water product.

These and other objects, features and advantages of this invention will become apparent from the following detailed description.

BRIEF DESCRIPTION OF THE DRAWINGS

FIG. 4a is an enlarged view of a portion of the section of FIG. 4;

FIG. 4b is an enlarged view of another portion of the section of FIG. 4;

FIG. 9 is a top plan view of a clarification tank in which, in one embodiment of the present process, a liquid mixture may be separated into a fatty component product phase and a water component product phase.

DETAILED DESCRIPTION OF THE INVENTION

Figure 1:
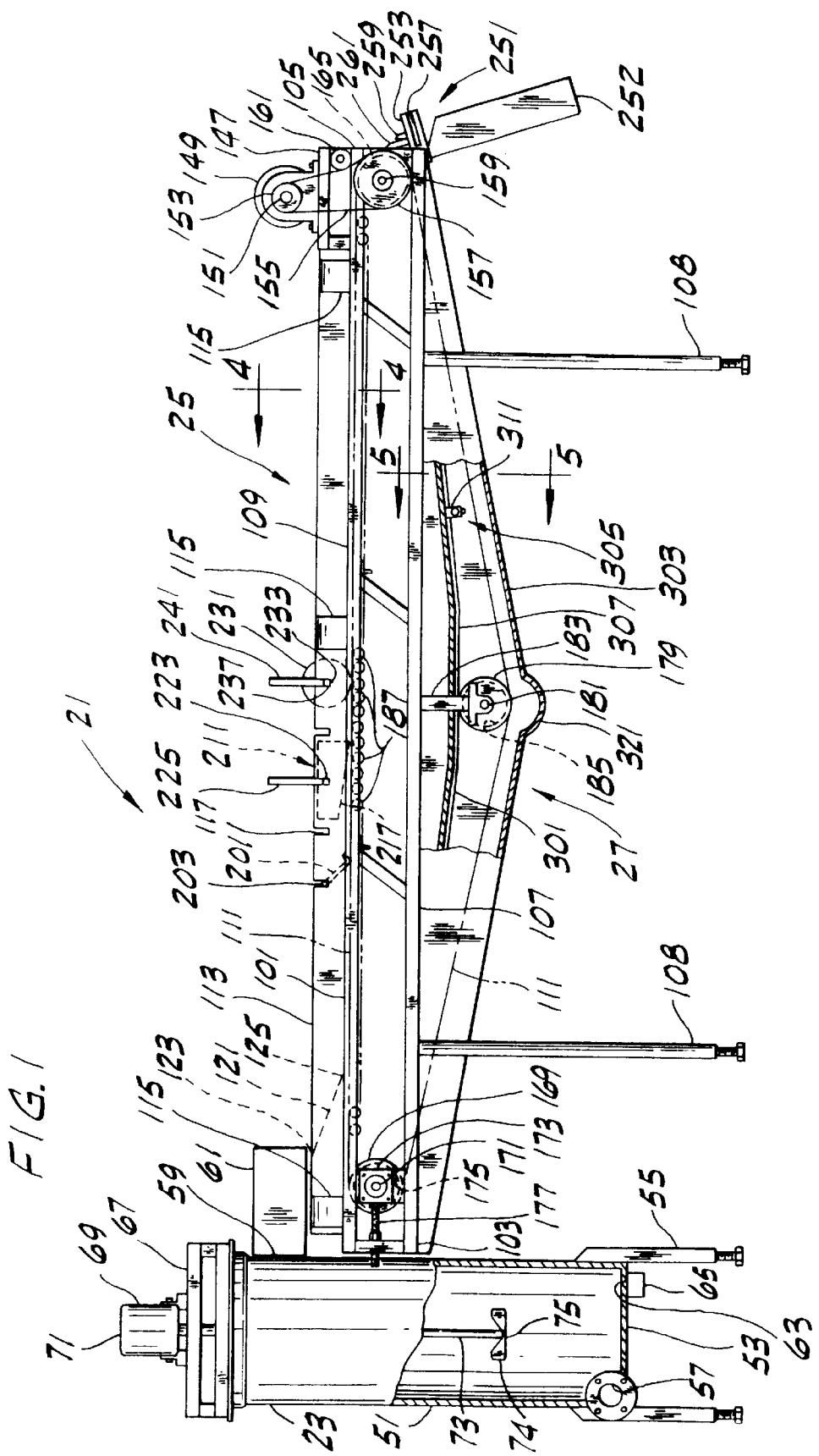
FIG. 1 is an elevation view of a preferred apparatus to be used in the process of the present invention for separating components of a treatment mixture.

For the purposes of this invention, the following definitions are important:

(1) float material—a material obtained from an industrial plant comprising proteinaceous solids, as well as fats, oils and greases ("FOG"); preferably, a material comprising the sludge cake or solid materials which are produced by the waste water treatment system of an industrial plant; most preferably, a material which has been separated from an underlying water phase after first subjecting waste water to an aeration process in a flotation zone in the presence of a flocculent;

(2) protein component product—the proteinaceous material recovered from the float material, which typically comprises animal protein but which may also include other types of protein depending upon the nature of the industry from which the float material is obtained;

(3) fatty component product—the liquid component which is recovered from the float material and which principally comprises fats, oils and greases;

(4) water component product—water recovered from the float material;

(5) carrier material—a liquid which affords the means by which to achieve one or more of the following results: (a) provide heat to a float material, and (b) ensure that the fats, oils and greases which become liquefied as a result of heating remain in a liquid state; and, (6) solids—unless otherwise stated, this term shall be understood to refer to ash, metal salts, proteinaceous material or solids, as well as any fats, oils and greases which may be present; stated another way, for purposes of determining the "solids content" of a given sample or material, any fats, oils or greases which are present shall be considered as "solids," in addition to any proteinaceous solids, ash and metal salts which may be present.

In a first embodiment, the carrier material may be a water-immiscible liquid compatible with, or fully miscible with, the fatty component of the float material. The carrier may advantageously comprise an oleaginous material, preferably comprising a natural oil. In this embodiment, particularly preferred carrier materials include natural oils, such as animal fat, vegetable oil and fish oil, which are of feed-grade quality or better. If the carrier material comprises a natural oil, such as animal fat, the animal fat content is typically greater than about 85 weight percent, preferably greater than about 90 weight percent, most preferably greater than about 95 weight percent. Similar proportions preferably prevail where the carrier predominantly comprises a vegetable oil, fish oil, or some other oil of feed-grade quality or better.

If a water-immiscible carrier is used, the density of the carrier is typically lower than one, preferably lower than about 0.95 g/cc. Where the carrier is an organic oil, its density is preferably between about 0.85 and about 0.95 g/cc. It is particularly preferred that an organic oil carrier comprise a heat stable material having a low vapor pressure so as to minimize both degradation of the carrier and generation of fumes in heating the carrier and mixing it with the float material. Advantageously, the decomposition temperature of the carrier is at least about 110° C. (230° F.). The vapor pressure of the carrier is typically not greater than about 25 mm Hg at 100° C. (212° F.) and, preferably, is not greater than about 15 mm Hg at 100° C. In addition, the vapor pressure of the organic oil carrier generally differs from a vapor pressure of the fatty component by not more than about 50 mm Hg at 100° C. Preferably, these vapor pressures will differ by no more than about 25 mm Hg at 100° C and, more preferably, by no more than about 10 mm Hg at 100° C. Most preferably, the vapor pressure of the carrier and the fatty component are substantially the same.

To facilitate mixing of the carrier with the float material and separation of the fatty component from the resulting mixture, it is preferred that an organic oil carrier have a dynamic viscosity no greater than about 100 cps at 60° C. (140° F.). It is further preferred that the surface tension of an organic oil carrier be between about 15 and about 60 dynes/cm at 25° C. (77° F.), and a solubility in water of no greater than about 10 percent. It is still further preferred that the solubility of water in such organic oil carrier be no greater than about 3 percent.

In a second embodiment, the carrier material is aqueous, typically comprising at least about 70 weight percent liquid water. Preferably, however, the aqueous carrier material comprises at least about 80 weight percent liquid water, more preferably at least about 90 weight percent liquid water, and most preferably at least about 95 weight percent liquid water. However, the precise composition of the aqueous carrier may vary, particularly if a continuous process is employed and recycling of the carrier occurs. If recycling of a resulting aqueous phase, or water component product phase, occurs, the aqueous carrier material may additionally comprise small amounts of insoluble solids (such as proteinaceous solids, fats, oils, and greases), various metal salts introduced or produced in the initial DAF process (such as aluminum or iron salts), as well as materials or compounds derived therefrom. In such cases, preferably the recycled aqueous carrier will contain less than about 1000 mg/liter of total suspended solids (TSS) and less than about 5000 mg/liter of BOD. Additionally, the recycled aqueous carrier will preferably contain less than about 500 mg/liter of fats, oils and greases, and less than about 600 mg/liter of TKN (Total Kjeldahl Nitrogen).

Regardless of whether the first or second embodiment of the present invention is employed, it is to be noted that preferably the carrier material is introduced in liquid form. Furthermore, use of the above-referenced carrier materials is advantageous because the resulting protein and fatty component products which are collected may be further processed without the need of a solvent removal step, such as vacuum distillation, which is typical for waste treatment processes that employ conventional organic solvents (see, e.g., U.S. Pat. No. 5,458,780). Accordingly, the present invention provides the means by which to eliminate the need for such a costly and time consuming process step.

In the present process, a treatment mixture is formed by mixing the carrier material with a float material. The carrier material may first be heated to a temperature below the boiling point of water, in order to minimize the evaporation of any water or other volatile substances which may be present. Typically, the carrier is heated to a temperature below about 99° C (210° F.). Preferably, the carrier is heated to a temperature within the range of about 66° C. (150° F.) to about 96° C. (205° F.). Most preferably, the carrier is heated to a temperature within the range of about 77° C. (170° F.) to about 93° C. (200° F.).

When the carrier material is an oil, heating is preferred in order to ensure the carrier material is in a liquid or flowable form, which will enhance its use in the present invention. In addition, for both the water and oil carrier materials, heating also affords a means by which to liquefy fat and grease contained within the float material, which tend to exist in a solid and/or semi-solid form in the sludge collected from a waste water treatment system. Experience has shown that direct heating of the float material will cause the fat and grease to liquefy but, in the absence of a carrier material, the liquefied fat and grease may eventually return to a solid and/or semi-solid form. Without being held to any particular theory, it is believed that this return to a solid and/or semi-solid form may occur because of the addition of flocculents or other processing chemicals, such as alum or ferric chloride, during the waste water treatment process. These chemicals may cause the fats to polymerize or otherwise congeal after liquefication. The carrier material, therefore, acts as a diluent to ensure that the fats and greases remain in a liquefied form.

It is to be noted in this regard, however, that direct heating of the float material may be an acceptable alternative if the flotation process and/or the waste water treatment equipment are modified such that a float material having a higher water content, or lower solids content, may be obtained. For example, float material obtained from a typical waste water treatment process contains about 20 to 25 weight percent solids, or about 75 to 80 weight percent water. If the waste water treatment process and/or equipment were modified such that a float material having a water content in excess of about 75 to 80 weight percent, preferably in excess of about 85 weight percent, and more preferably in excess of about 90 weight percent, could be skimmed or collected, such float material may have a sufficiently high water content such that, upon heating, the fats and greases remain in a liquefied form. Accordingly, it is to be noted that if a float material containing a sufficiently high water content, or sufficiently low solids content, can be collected from the waste water treatment system, a carrier material may not be necessary in order to perform the process of the present invention.

The treatment mixture is formed by mixing the heated carrier material with the float material. In a preferred embodiment, prior to forming the treatment mixture, the float material is first skimmed or collected from the waste water treatment system and transferred to a pre-mix tank where an antioxidant may be added. Generally speaking, any commercially available antioxidant which is suitable for stabilizing the particular materials of interest under the present process conditions may be used. Typically, an antioxidant such as ethoxyquin (commercially available under the trademark Santoquin® from Novus International, Inc.) is added to prepare a stabilized float material, which may comprise proteins, fats, oils and greases derived from poultry, beef, sheep or fish, among other things. Other antioxidants which may be suitable for use in the stabilization of these materials, as well as soy-related proteins, fats, oils and greases, include tetrabutylhydroquinone (TBHQ), 2,6-di-tert-butyl-4-methylphenol (BHT), and 2- or 3-tert-butyl-4-methoxyphenol (BHA).

Typically, the antioxidant is added in a quantity which is commercially recommended for the particular type of material that is to be stabilized, given the previal conditions of the process conditions (i.e., the composition and pH of the float material, and the temperature of the process, among other things). Preferably, about 0.5 pounds to about 20 pounds of the antioxidant, such as ethoxyquin, are added per 2000 pounds of solids (i.e., material such as proteinaceous solids, fats, oils, greases, metal salts and ash) present in the float material; that is, about 0.02 to about 1 weight percent of the antioxidant is added, based on the approximate weight of solids present. More preferably, about 1 to about 4 pounds of the antioxidant are added, or about 0.05 to about 0.2 weight percent.

The antioxidant acts to slow, or prevent, the further production of peroxides during the present process. In addition, this stability is imparted to these materials for a period of time, after the process has been completed, which is sufficient to allow for the resulting protein component product and fatty component products to be further processed on-site or suitably transferred to a rendering facility. Accordingly, more preferably, a sufficient quantity of an antioxidant is added such that the peroxide content of the resulting protein and fatty component products, immediately after separation and collection, may exceed the initial content in the float material (as determined just prior to the addition of the antioxidant) by not more than about 20 milliequivalents per kilogram of fat (meq/kg fat), and preferably by not more than about 10 meq/kg fat. Most preferably, however, a quantity of the antioxidant is added such that, in conjunction with the optimization of other process conditions, the peroxide content of the protein and fatty products is about equal to the initial peroxide content in the float material.

It is to be noted, however, that as the concentration of unsaturated fats in the float material increases, the quantity of the antioxidant to be added may also need to be increased. Furthermore, the hydrolysis process may become autocatalytic if the peroxide concentration becomes too high. Accordingly, therefore, it is additionally preferred that a quantity of the antioxidant be added which is sufficient to ensure that the peroxide content does not increase to a level at which the hydrolysis process may become autocatalytic.

The quantity of the antioxidant which is added is preferably sufficient to produce a fatty component product which generally has an antioxidant content which ranges from about 200 to about 1250 ppm or more, and preferably from about 400 to about 800 ppm, depending upon the type of material that is to be stabilized. In this regard, it is to be noted that the resulting fatty component product desirably contains a higher antioxidant concentration as the storage temperature increases. It is to be further noted that, to the extent the collected solids (i.e., the protein component product) contain fats, oils and greases, they too should have a concentration of the antioxidant which is in proportion to the amount of fats, oils and greases they contain.

In addition to adding an antioxidant to the float material in order to impart prolonged stability, the pH may optionally be monitored and adjusted to aid in preventing hydrolysis. Hydrolysis may begin to occur to some degree under either basic or acidic conditions, with the rate of hydrolysis increasing as the float material becomes more basic or more acidic. Therefore, typically the pH of the float material is maintained within the range of about 3 to about 10. However, the pH may be monitored and adjusted, if necessary, to ensure the pH preferably ranges from about 4 to about 8, and more preferably from about 6 to about 7.

During the addition of the antioxidant in the premix tank, agitation of the float material is preferred in order to ensure the thorough dispersal of the antioxidant throughout the float material. Furthermore, because the float material continues to lose water (i.e., "dewater") even after being skimmed from the surface of the waste water, agitation is imposed to ensure that the solids which are present generally remain evenly suspended. In this way, agitation acts to ensure that the composition of the float material being used to prepare the treatment mixture is generally consistent.

The treatment mixture is typically prepared by mixing about equal quantities of the carrier material with the float material. Preferably, the treatment mixture will have a ratio of float material to carrier material between about 1:1 and about 1:20, and more preferably between about 1:2 and 1:10. Most preferably, the treatment mixture will have a ratio of float material to carrier material between about 1:3 and about 1:10. However, the ratio of float material to carrier material is in part a function of the composition of the float material. For example, as the water content of the float material decreases and the solids content increases, preferably more carrier material is used to form the treatment mixture. Alternatively, as the water content of the float material increases and the solids content decreases, preferably less carrier material is used. Typically, therefore, the treatment mixture is formed by mixing quantities of float material and carrier material, such that the resulting treatment mixture has a solids content (i.e., the combined content of proteinaceous material, fats, oils and greases, as well as ash and salts) ranging from about 2 weight percent to about 20 weight percent. Preferably, the solids content in the treatment mixture will range from about 3 weight percent to about 10 weight percent. Most preferably, the solids content in the treatment mixture will range from about 4 weight percent to about 6 weight percent.

The ratio of float material to carrier material is also in part a function of the desired result of the process. For example, the process of the present invention may be used primarily to dewater the solids contained in the float material. Alternatively, the present process may be used to both dewater and maximize the removal, or isolation, of the fatty component product from the float material. If dewatering of the solids is the desired result, then a treatment mixture having a solids content ranging from about 10 to about 20 weight percent may be preferred. However, if maximizing the production of fats, oils and greases from the float material is desired, then a solids content ranging from about 3 to about 10, and preferably about 4 to about 6, weight percent is preferred, as noted above.

Regardless of the desired result, the volume of carrier material is preferably sufficient to ensure the thorough suspension of the solids contained in the float material. In addition, the volume of the carrier material is preferably sufficient to improve the flowability, and reduce the viscosity, of the treatment mixture. Furthermore, with the aid of agitation or mixing, the thorough suspension of solids acts to prevent solids from coming to rest on heated surfaces within the heating tank, or other apparatus within which the treatment mixture is contained and heated, thus preventing the solids from sticking to these surfaces. As a result, heat transfer efficiency is preserved and clean up of the equipment can be more easily performed once the treatment process is complete.

Figure 8:
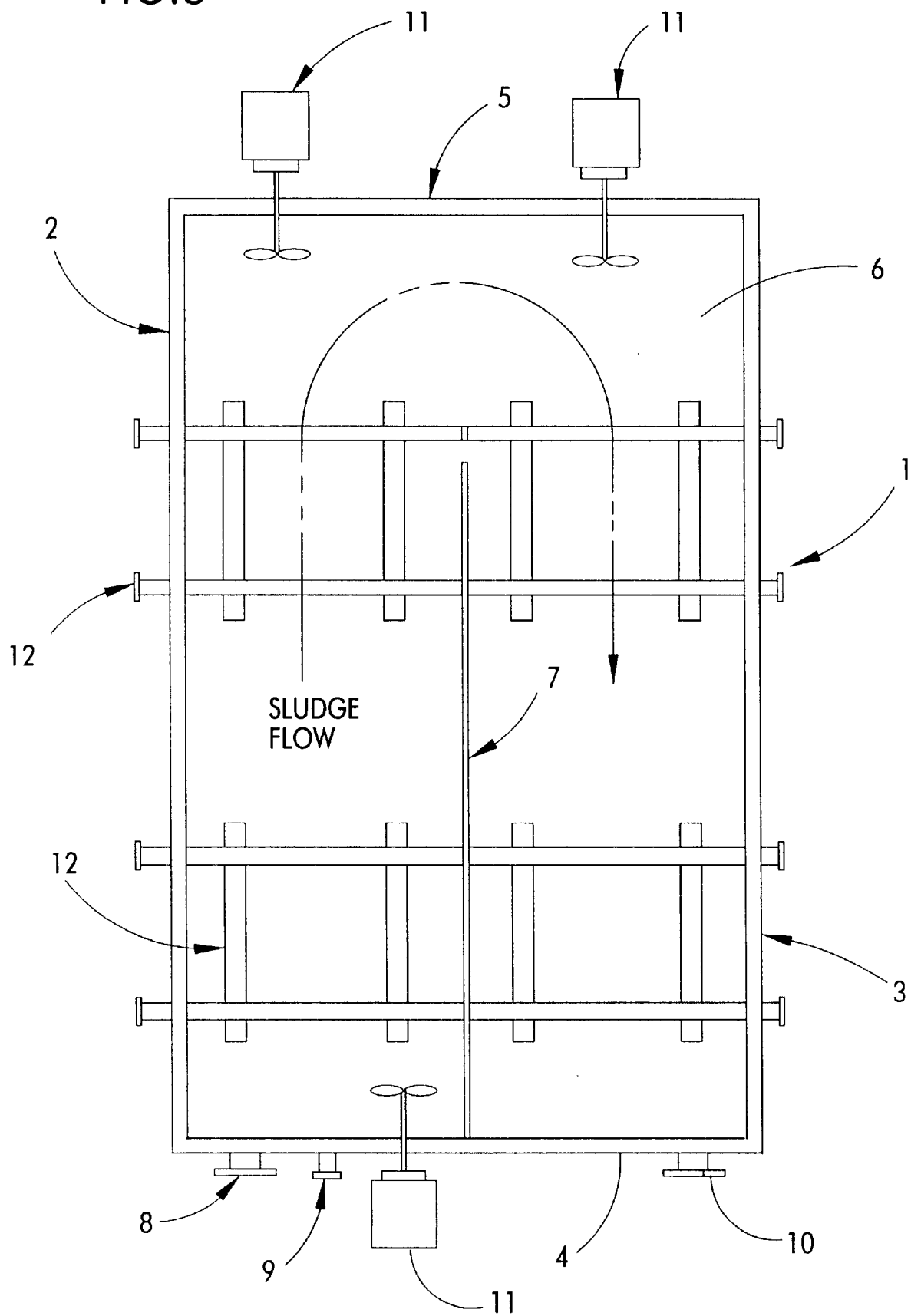
FIG. 8 is a top plan view of a tank in which, in one embodiment of the present process, a treatment mixture may be formed.

Heating of the carrier material, as well as formation of the treatment mixture, may be carried out using methods and apparatus which are well known in the art. Referring now to FIG. 8, one embodiment of an apparatus suitable for heating the treatment mixture will herein be described. A vertical tank, indicated generally at 1, of horizontal cross-section includes side walls 2 and 3, end walls 4 and 5, and a bottom wall 6. A vertical baffle 7 extends from bottom wall 6 and end wall 4 substantially parallel to and equidistant from side walls 2 and 3. The end of baffle 7 opposite end wall 4 is spaced from end wall 5 to define a flow path therebetween. Float material may be introduced into the tank through an inlet 8 in end wall 4 between baffle 7 and side wall 2, and carrier material may be introduced through another inlet 9 in the same region of the interior of tank 1. The mixture of carrier and float material may be removed from tank 1 via an exit port 10 in end wall 4 between baffle 7 and side wall 3. Thus, the walls of tank 1 and baffle 7 define a longitudinal horizontal flow path of relatively high length to lateral dimension for passage of the treatment mixture through the tank.

Tank 1 is further provided with at least one agitator which extends vertically into the tank, thus causing the float material and carrier material to be intimately mixed in a dispersion zone within the tank. As illustrated, tank 1 includes three agitators 11 longitudinally spaced along the flow path of treatment mixture through tank 1, so that substantially the entire working volume of the tank constitutes a dispersion zone for intimate contact and thorough mixing of carrier and float material. Heating coils 12 are positioned within tank 1 to provide heat to the treatment mixture in order to ensure the mixture remains in liquefied form.

A treatment mixture is formed as the carrier material and float material enter tank 1 and become mixed by agitators 11. The rate of agitation is sufficient to avoid settling of the solids which are present in the float material, and yet it is not so vigorous that shearing of these solids occurs. This agitation also acts to maximize the surface area of the float and carrier materials, in order to allow for intimate contact between them. Such contact acts to provide a means by which to efficiently transfer heat from the carrier material to the float material, and to cause the carrier material to coalesce and form a single phase with the components of the float material with which the carrier material is miscible. Mixing at this stage is therefore sufficient to create a substantially homogeneous mixture, which is to be understood herein as the thorough dispersion of the float material in the carrier material, or the carrier material in the float material, and which is sufficient to promote the coalescence of the carrier material with the components of the float material with which it is miscible. Stated another way, mixing is sufficient to ensure thorough dispersion such that a substantially uniform treatment mixture is formed.

The treatment mixture proceeds through the tank substantially in a thoroughly dispersed state until it exits the tank through port 10. Residence time of the treatment mixture in the dispersion zone typically ranges from at least about 30 seconds to about 1 hour, depending upon the characteristics of the carrier and float materials. Preferably, the residence time ranges from about 10 minutes to about 40 minutes. More preferably, the residence time ranges from about 15 minutes to about 30 minutes. Most preferably, the residence time is at least about 20 minutes. However, the preferred residence time is in part a function of the temperature at which the treatment mixture is maintained; that is, as the temperature of the treatment mixture decreases, the residence time of the treatment mixture may need to be increased.

The temperature of the treatment mixture, as well as the residence time of the treatment mixture within the heating tank, is important for purposes of maximizing the amount of the fatty component product which may be isolated from the float material. Without being held to any particular theory, it is believed that the heating of the treatment mixture acts to "cook" the proteinaceous solids which are present, thus causing the fats, oils and greases to liquefy and escape. Stated another way, it is believed that heating of the treatment mixture acts to denature proteins and breakdown any emulsion present such that fats, oils and greases are released from the floc and proteinaceous solids. As a result, preferably the temperature and residence time are controlled to optimize the yield of the fats, oils and greases.

Furthermore, experience to date suggests that a residence or exposure time of at least about 20 minutes, within the temperature range of about 77° C. (170° F.) and about 930° C. (200° F.), is sufficient to deactivate proteolytic and lipolytic enzymes which would otherwise act to degrade the protein and fatty component products. Such process conditions also act to kill pathogens (such as salmonella and e-coli) which are harmful to animals or humans. As a result, as further discussed below, the process of the present invention enables protein and fatty component products to be obtained which are essentially pathogen-free and which have prolonged stability, as compared to the typical protein and fatty components contained in a float material obtained from conventional waste water treatment processes. Accordingly, it is desirable to extend the exposure time as necessary in order to ensure the thorough destruction of such harmful enzymes and pathogens.

It is to be understood that the means by which heating and mixing are accomplished may be other than that which is herein described and still fall within the scope of the present invention. For example, rather than using the treatment mixture tank as described above, a plug flow reactor may be employed. Such a reactor, or cooker, may be preferred because it acts to eliminate short-circuiting problems that may otherwise occur in a batch-type reactor. A plug flow reactor is preferably designed to provide a residence time within those ranges noted above. More preferably, the reactor is designed to maintain the treatment mixture within the temperature range of about 77° C. (170° F.) and about 93° C. (200° F.) for at least about 20 minutes.

The reactor may be constructed of materials and by means common in the art. In one embodiment, the reactor comprises stainless steel piping, about 8 inches in diameter and about 300 feet or more in total length, having adequate insulation to ensure the mixture remains within the designated temperature range as it passes therethrough. Typically, the treatment mixture is formed in-line, by simultaneously feeding the carrier material and the float material into the line or pipe which feeds the reactor. Heat may be provided by means common in the art, including jacketing the reactor pipe itself to supply heat externally or supplying heat internally by sparging steam into the mixture as it enters the reactor. Additionally, either fresh water or a portion of the water component product may be added in-line, or to the pre-mix tank itself. When steam is sparged into the mixture directly, the quantity of additional water to be added is metered or controlled to allow for the water resulting from steam condensation, such that the solids content of the treatment mixture remains within the ranges noted above.

It is to be noted however that, if the plug flow reactor is employed in the present process, formation of the treatment mixture, as well as heating the treatment mixture, may be other than that herein described without departing from the scope of the invention.

In order to avoid the settling of solids and subsequent plugging of the reactor pipe, the reactor is preferably designed to provide a turbulent flow. Typically, the flow rate for the above-described embodiment ranges from about 5 to about 70, and preferably from about 15 to about 40, gallons per minute (g $\mu$m). Most preferably, the flow rate will fall within a range that maximizes the throughput of the present process while ensuring that the solids remain suspended in the mixture and that the phases remain thoroughly dispersed.

It is to he noted, however, that experience to date suggests turbulent flow is not narrowly critical. For example, laminar flow tests suggest this is also acceptable, provided the settling of solids does not occur. In addition, it is to be further noted that axial back mixing is generally not of concern so long as the average residence time is sufficient to ensure a reasonable residence time at all points along the diameter of the pipe.

An alternative to a plug flow reactor is a cascaded series of batch-type reactors of the type described above. A series of such reactors resolves any short-circuiting concerns and ensures that the desired exposure time is achieved. Using such a configuration, the treatment mixture is formed in a first reactor and, after mixing for a specified period of time, it is then transferred to a second reactor, where mixing continues. The specific number of reactors to be employed in such a system would be, in part, a function of the desired residence or exposure time. However, a limited number, e.g., two or three reactors, is ordinarily sufficient to eliminate any adverse effects of back mixing.

After the treatment mixture has been maintained within the desired temperature range for the specified period of time, a protein component product may be separated from the treatment mixture by any means known to the art for removing solids from solution. For example, a centrifuge, a pre-coated filter (such as a straight-line vacuum filter), a belt press, or a rotary drum filter may be used to separate the protein. Alternatively, a shaker screen may be used which comprises one or more screens (i.e., filters) which progressively screen out and discharge the protein product. The treatment mixture is passed through the shaker screen to remove the protein product, and then a liquid mixture is collected and discharged through an opening located in the lower portion of the equipment.

In a preferred embodiment, however, separation of the protein product is achieved by transferring the hot treatment mixture onto a belt filtration apparatus comprising a non-corroding mesh belt, such as a stainless steel belt, having a mesh size ranging from about 80 to about 150 mesh and preferably being about 100 mesh. Such a filter is capable of receiving the hot treatment mixture, which typically ranges in temperature from about 77° C. (170° F.) to about 93° C. (200° F.), without deformation of the belt. More specifically, the belt is preferably constructed of a material which inhibits deformation of the mesh openings (e.g. stretching of the screen) of the belt when exposed to the heated treatment mixture, and which is compatible (e.g., corrosion resistant) with the mixture. It is to be understood, however, that the filtering belt may be made of a material other than stainless steel as long as the belt maintains this dimensional stability of the mesh openings and is substantially corrosion resistant when exposed to the treatment mixture and the high temperatures associated with the mixture (e.g., up to about 99° C.).

A particularly preferred embodiment of such a solids separation or belt filter system is disclosed in greater detail below, under the section denoted BELT FILTRATION APPARATUS. This preferred embodiment enables the gravity separation of the protein component product to begin almost immediately upon the depositing of the mixture onto the belt. Gentle, positive pressure may additionally be applied to the solids which are collected on the surface of the belt to aid in the further removal of the fatty and water component phases from the solids. However, such pressure is preferably not so significant that proteinaceous solids are forced though the mesh belt. Forcing solids through the belt is not desirable because a portion of the protein product may be lost, and because blinding of the belt may result. If blinding occurs, clean up may be more time consuming and may generate more waste water, due to the additional rinsing required to clean the belt.

Depending upon the particular means employed to recover the protein component product, one or more flocculating agents may preferably be added to enable a more efficient and complete recovery. For example, experience to date suggests that the addition of a cationic polymeric flocculating agent is preferred when the above-referenced filtration apparatus is employed to recover the protein component product. The addition of one or more flocculating agents is believed beneficial to solids separation because, during the formation of the treatment mixture, floc present in the float material is destroyed or disrupted by the agitation and heat of the process. Although disruption of the floc is considered favorable to the removal of water, as well as fats, oils and greases present within the floc, a more efficient and complete removal of the protein component product from the treatment mixture may be achieved when flocculated particles are formed prior to filtration.

Once the flocculating agent has been added, the treatment mixture is preferably passed through a pre-filtration mix tank in order to ensure the thorough mixing of the flocculating agent. In a preferred embodiment, this tank is filled from the bottom which, with the aid of gentle agitation, acts to create an upward spiral in the mixture that aids with mixing of the flocculating agent and with floc formation. Agitation is preferably gentle in order to avoid the shearing of the floc which is formed.

The time spent adding and incorporating the flocculating agent into the treatment mixture is preferably minimized in order to prevent any significant drop in the temperature of the mixture. For example, typically the time required to form the flocculated particles results in less than about a 10° C. drop in the temperature of the treatment mixture. Minimizing this temperature drop is preferred in order to maximize the amount of fatty component product that is obtained after filtration and phase separation is complete. More specifically, minimizing this temperature drop is preferred because higher filtration temperatures help to ensure the fatty component remains in a liquefied form, thus limiting the amount of fatty component that is filtered out of the mixture as part of the proteinaceous solids which are collected.

The flocculating agent is preferably added to the treatment mixture prior to the mixture being transferred to the filtration apparatus, thus ensuring sufficient time for mixing and floc formation. More specifically, using a combination of pumps and valves common in the art, the flocculating agent is preferably added to the line or pipe through which the treatment mixture passes as the mixture is transferred to the filter. Alternatively, the floc may be added separately to the bottom of the mix tank with the treatment mixture.

Many polymeric flocculating agents, both natural and synthetic, which are standard to the waste water treatment industry are suitable for use in the present invention. Common synthetic flocculating agents include polyacrylamides (such as Polyhance 4153, commercially available from Wacon Technical Services, Inc.), polyamines (such as poly-2-hydroxypropyl-N,N-dimethylammonium chloride), as well as polymeric ammonium salts (such as poly-dimethyldiallylammonium chloride), among others. The type and quantity of a flocculating agent to be added are in part a function of the composition, pH and temperature of the treatment mixture. In addition, the solids content in the treatment mixture is a factor to be considered, with a higher solids content mixture requiring a higher quantity flocculating agent. However, generally speaking, about 1 to about 150 parts of the agent should be added per million parts of the treatment mixture. Preferably, a quantity of the agent is added such that the concentration ranges from about 25 to about 125 ppm, and more preferably from about 50 to about 100 ppm.

It is to be noted that the particular flocculating agent added, as well as the quantity to be added and the point of addition, may be other than that herein described without departing from the scope of the present invention.

The protein component product which is recovered typically has a solids content (i.e., a combined content of proteinaceous solids, fats, oils and greases, as well as ash, salts and other non-aqueous materials) of at least about 25 percent by weight, preferably at least about 30 percent, more preferably at least about 35 percent, still more preferably at least about 40 percent, and most preferably at least about 50 percent. Stated another way, the protein component product typically has a moisture content which is less than about 75 percent by weight, preferably less than about 70 percent, more preferably less than about 65 percent, still more preferably less than about 60 percent, and most preferably less than about 50 percent. In addition, operating conditions of the present process will preferably be controlled such that the amount of fats, oils and greases left behind with the protein product is minimized. Typically, therefore, the protein product has a ratio of proteinaceous solids to the combined content of fats, oils and greases which ranges from about 0.5:1 to about 1:1. Preferably, the protein product has a ratio of proteinaceous solids to the combined content of fats, oils and greases which ranges from about 1:1 to about 2:1. More preferably, however, the ratio of proteinaceous solids to the combined content of fats, oils and greases is about 3:1, or more.

The process of the present invention advantageously produces a protein component product which, in addition to having a low moisture content, additionally possesses improved stability, as compared to the stability of the float material produced by standard waste water treatment processes. For example, as discussed above, the conditions of the present process act to deactivate proteolytic and lipolytic enzymes which would otherwise act to degrade the protein and fatty component products. Such process conditions act to kill pathogens which are harmful to both animals and humans, as well. Accordingly, immediately following filtration, the protein product is essentially pathogen-free; that is, the protein product is essentially free of microbial activity (such as that associated with salmonella and e-coli), having a total gram negative plate count which is less than about 50 cfu/g (colony forming units per gram of sample tested), preferably less than about 40 cfu/g, more preferably less than about 20 cfu/g, still more preferably less than about 10 cfu/g, and still more preferably less than about 5 cfu/g, as determined by standard test methods (see, e.g., American Organization of Analytical Chemists Official Methods 989.12 and 991.13). Most preferably, the protein product will have essentially a zero gram negative plate count, testing negative for both salmonella and e-coli.

The liquid mixture which remains comprises a water-immiscible phase comprising the fatty component product (i.e., the fatty component phase) and an aqueous phase which contains the water component product (i.e., the water component phase). Typically, the liquid mixture has a fatty component, or fat, content ranging from about 1 weight percent to about 6 weight percent or more. However, this content may vary as the concentration of the fat in the starting float material increases or decreases. The liquid mixture may additionally comprise a small amount of proteinaceous solids which were not removed during the solids separation step. However, if such proteinaceous solids are present, preferably this concentration is less than about 2 percent, and more preferably less than about 1 percent, by weight of the liquid mixture.

The phases of the liquid mixture may be separated using various types of dewatering equipment known to the art, including a centrifuge. Preferably, however, phase separation is achieved by transferring the liquid mixture to a conventional clarifier commercially available from, for example, Waterlink (model SRC100) or Facet (model MCT-23-2). It is to be noted that, in a preferred embodiment, the liquid mixture is fed by gravity from the belt filter, or other means by which the solids are separated, to the clarifier. Experience to date suggests a gravity feed system is preferred because it ensures that the phases are not re-emulsified during the transfer. As a result, phase separation may occur more quickly. However, a pump may be used to transfer the liquid mixture, provided it does not create agitation sufficient to re-emulsify the phases.

Referring now to FIG. 9, as noted above, the liquid mixture may be separated in a clarifier comprising a vertical tank, indicated generally at 13, of horizontal cross-section which includes side walls 14 and 15, end walls 16 and 17, and a bottom wall 18. Preferably, a two compartment clarifier is used, the first compartment 19a and second compartment 19b being separated by a vertical baffle or weir 20, which extends from bottom wall 18 and between side walls 14 and 15. The mixture is introduced into the first compartment 19a of the clarifier in which the lighter fatty component phase rises to the top.

In batch operation or during start-up of a continuous process, the fatty component product phase accumulates above the aqueous phase until it eventually overflows the top of the weir 20 into the second compartment 19b. In a continuous operation, charge of liquid mixture to the first compartment 19a and flow of fatty component product phase over the weir 20 thereafter continues in steady state. The water component product phase is withdrawn from the lower part of the first compartment through a port (not shown). Further dewatering of the fatty component product phase may take place in the second compartment of the clarifier.

Although some impurities may be present, the fatty component product which is collected has a water content which is typically less than about 4 percent by weight and, preferably, less than about 2 percent by weight. Additionally, as noted above, the process of the present invention provides a fatty product which possesses improved stability due to the addition of an antioxidant to the float material, the antioxidant ultimately becoming incorporated into the fatty component product. The antioxidant acts to slow or limit the increase in the concentration of peroxides in the fatty component product. The pH of the product, which typically ranges from about 4 to about 7, also acts to impart stability to the product.

Furthermore, like the protein product, process conditions act to provide an essentially pathogen-free fatty component product; that is, the fatty product is essentially free of microbial activity, having a total gram negative plate count which is less than about 50 cfu/g (colony forming units per gram of sample tested), preferably less than about 40 cfu/g, more preferably less than about 20 cfu/g, still more preferably less than about 10 cfu/g, and still more preferably less than about 5 cfu/g, as determined by standard test methods (see, e.g., American Organization of Analytical Chemists Official Methods 989.12 and 991.13). Most preferably, the protein product will have essentially a zero gram negative plate count, testing negative for both salmonella and e-coli.

In addition, the process of the present invention yields a fatty component product which, immediately after separation and collection, has a free fatty acid content which exceeds the initial free fatty acid content in the float material (as determined just prior to the addition of the antioxidant) by not more than about 10 weight percent (as determined based on the fat content of the sample), and preferably by not more than about 5 weight percent. Most preferably, however, the fatty component product has a free fatty acid content which is about equal to the initial free fatty acid content in the float material.

The carrier material is contained in the phase with which the carrier is compatible. If the carrier is compatible with the fatty component phase, in addition to simply collecting this phase as a product, the fatty component product phase may alternatively be divided into a plurality of fractions, including a fatty component product fraction and a fatty recycle fraction, the carrier material thus comprises the fatty recycle fraction.

The water component product phase which remains in the first compartment is discharged and recycled back to an industrial waste water treatment system, where it may be further processed into the sewer system if all discharge requirements have been met. Typically, the water component product has a fat content which is less than about 1 weight percent, preferably less than about 0.5 weight percent, and most preferably less than about 0.1 weight percent. Additionally, if the carrier material is comprised of water, the water component product phase may be divided into a water component effluent fraction and an aqueous recycle fraction, the carrier material thus comprises the aqueous recycle fraction.

In another alternative embodiment of the process of the present invention, the float material may be separated into its respective protein, fatty and water component products by first subjecting the treatment mixture to a dewatering process. A clarifier, as discussed above, may be used. Preferably, however, a clarifier comprising a single, round compartment with a conical shaped bottom is employed. The treatment mixture is added to this tank and the fatty component product phase and the water component product phase are allowed to separate. A side port near the top of the tank is used to remove the fatty component product. The water component phase, along with the protein component product which settles near the bottom of the tank, are removed through a centrally located port at the bottom of the cone. The protein component product may then be collected by passing the liquid component phase through a shaker screen, or by using some other means for removing solids as discussed above. However, it is to be noted that the rate at which the proteinaceous solids settle can be low, while the angle of repose for such solids can be high. As a result, process time may be increased.

The process of the present invention affords a means by which to obtain a protein component and a fatty component product from a float material in a form which is sufficiently free of water such that it may be sent directly to a renderer, feed mill, or further processed, without additional treatment. Furthermore, due to the improvement in stability, such products may be supplied in higher quality, or better condition, as compared to typical waste water treatment sludge or float material.

The process of the present invention also affords a more energy efficient means by which to separate the various components of a float material, as compared to conventional processes employing standard evaporation techniques for example, because energy is not spent on the evaporation of water or organic solvents.

It is to be noted that, during the practice of this invention, various systems and controls can be employed to monitor and control the process steps and the flow rate of the various substances. These systems and controls can be based on computer calculations and/or manual adjustments.

It is to be further noted that the process of the present invention has been described in detail with particular reference to preferred embodiments. However, variations and modifications can be made without departing from the spirit and scope of the invention as defined by the claims which follow. Such variations or modifications may include, among other things, the formation of a treatment mixture by either (i) heating the float material and mixing it with a carrier material, or (ii) mixing the float material and the carrier material and then applying heat.

Finally, it is to be noted that the process of the present invention can be effectively used in either a batch or continuous system. For reasons of process economy, however, a continuous system is preferred.

Belt Filtration Apparatus

Now referring to the drawings, and particularly to FIG. 1, the reference numeral 21 generally indicates a preferred filtration apparatus, suitable for use in the process of the present invention for separating and recovering the various components (i.e., the protein component product, the fatty component product and the water component product) of the treatment mixture for further processing. In general, the filtration apparatus 21 comprises a feed tank 23 (i.e., a pre-filtration mix tank) for receiving treatment mixture from the source of treatment mixture, a separation system, indicated generally at 25, for receiving treatment mixture from the feed tank and separating the various components of the mixture, a fluid recovery system, generally indicated at 27, for recovering water and fatty components separated from the mixture as well as any waste mixture remaining after separation of the mixture components, and a control panel (not shown) for controlling operation of the apparatus.

The feed tank 23 is generally cylindrical, having a side wall 51, a bottom wall 53 and support legs 55 supporting the tank in an upright orientation. An inlet port 57 is disposed in the side wall 51 adjacent the bottom wall 53 in fluid communication with the conduit in which the treatment mixture is formed. The pump forces the treatment mixture through the conduit and into the tank 23 via the inlet port 57. Thus it can be seen that the tank 23 may be located remotely from the treatment mixture source. In the illustrated embodiment, the inlet port 57 is disposed in a generally tangential relationship with the side wall 51 of the tank 23 so that mixture pumped into the tank generates a circumferential swirling of the mixture at the bottom of the tank to inhibit stagnation of the mixture.

An outlet port 59 is disposed in the side wall 51 of the tank 23 substantially adjacent the top of the tank. The treatment mixture fills the tank 23 as it enters through the inlet port 57 and, once the level of the mixture in the tank rises to the height of the outlet port 59, the mixture flows out of the tank via the outlet port. In this manner, treatment mixture continually rises within the tank 23 upward to the outlet port 59 at the top of the tank, thereby inhibiting stagnation of the mixture at the bottom of the tank. However, it is contemplated that feed tanks in which treatment mixture enters the tank 23 other than at its bottom, such as where the mixture enters through the top of the tank, fall within the scope of this invention. A feed tube 61 in fluid communication with the outlet port 59 of the tank directs the mixture to the separation system. A drain opening 63 and associated closure 65 are provided in the bottom wall 53 of the tank 23 for selective draining of the mixture from the tank when cleaning is necessitated.

The top of the tank 23 is open to permit monitoring of and access to the interior of the tank. A frame 67 is mounted on the upper rim of the tank 23 to support a mixture agitator 69 above the open top of the tank. The agitator 69 comprises a motor 71 attached to the frame 67 generally centrally above the open top of the tank 23. A shaft 73 connected to the motor 71 for driven rotation about the rotation axis of the shaft extends down into the tank 23 through the open top of the tank. Blades 74 of a propeller 75 extend radially outward from the bottom of the shaft 73 for conjoint rotation with the shaft. Rotation of the propeller 75 agitates the treatment mixture to further effect the generally circumferential swirling of the mixture so that the mixture spirals upward within the tank 23 to the level of the outlet port 59. The rate of agitation is preferably sufficient to avoid settling of the proteinaceous solids which are present in the treatment mixture, but not so vigorous that shearing of these solids occurs. It is also to be understood that agitators other than the type shown and described herein may be used without departing from the scope of this invention, as long as the agitator is capable of inhibiting settling of the solids without resulting in shearing of the solids.

The separation system 25 is disposed adjacent the feed tank 23 and is supported by a separator frame 101 with an upstream end 103 of the separation system positioned generally beneath the feed tube 61 for receiving treatment mixture from the feed tank. The separation system 25 is capable of separating the various components of the treatment mixture and carrying solids, which contain the particulate protein component product of the mixture, to a downstream end 105 of the system. The separator frame 101 includes a pair of longitudinally extending lower rails 107 mounted on support legs 108 and a corresponding pair of upper rails 109 supported in parallel spaced relationship above the lower rails. The separator frame 101 is constructed of stainless steel tubing, preferably square in cross-section and having a cross-sectional dimension of about 1.5 in.×1.5 in. As an example of the overall dimensions of the separator frame 101, the frame of the illustrated embodiment is approximately 11 ft. long and 5 ft.-4 inches wide. It is understood, however, that these dimensions may be altered depending upon mixture processing requirements and remain within the scope of this invention.

Figure 2:
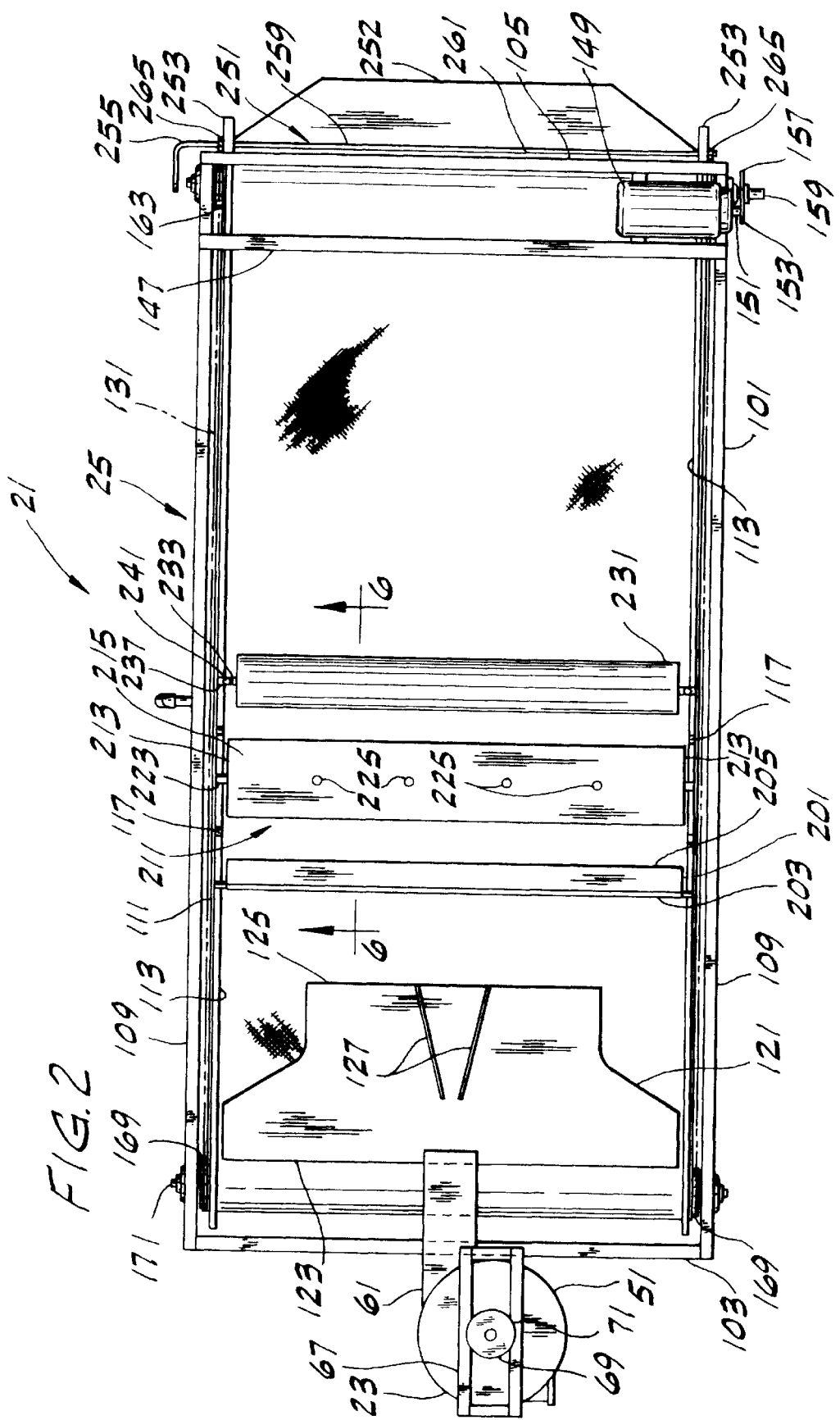
FIG. 2 is a plan view of the apparatus of FIG. 1.

With reference to FIGS. 1 and 2, the separation system 25 comprises an endless filtering belt 111 constructed for allowing the water and fatty components of the treatment mixture (e.g, the liquified components of the mixture) to pass through the belt while carrying any unfiltered components toward the downstream end 105 of the separation system. The belt 111 is sufficiently wide to extend transversely generally between the upper rails 109 of the separator frame 101. For example, the belt 111 shown in FIG. 1 is approximately 4 ft.-8 in. wide. The filtering belt 111 is preferably constructed of a stainless steel screen having a mesh size in the range of about 80–150 microns. The stainless steel construction of the belt 111 inhibits deformation of the mesh openings (e.g. stretching of the screen) of the belt when exposed to the heated treatment mixture carried by the belt, and is compatible (e.g., corrosion resistant) with the mixture. It is understood, however, that the filtering belt 111 may be made of materials other than stainless steel, as long as the belt maintains dimensional stability of the mesh openings and is substantially corrosion resistant when exposed to the treatment mixture and the high temperatures associated with the mixture (e.g., up to about 99° C.). The mesh size of the belt 111 may vary depending on the size of particulate components to be separated from the mixture and remain within the scope of this invention.

Figure 6:
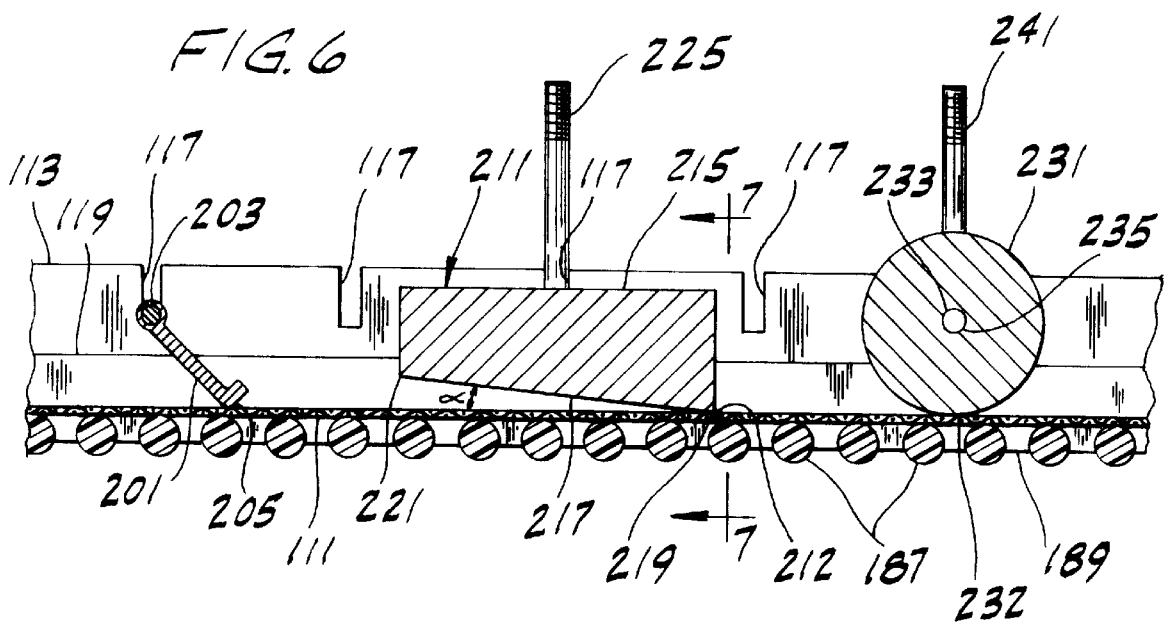
FIG. 6 is a fragmented section taken in the plane of line 6—6 of FIG. 2.

Opposing guide rails 113 extend longitudinally from the upstream end 103 of the separation system to the downstream end 105 in spaced relationship above the filtering belt. As seen best in FIG. 4, the guide rails 113 are disposed inward of the upper rails 109 of the separator frame 101 and are attached to the upper rails by mounting brackets 115 so that a small margin of each side of the belt 111 extends outward beyond the guide rails. Downwardly extending rectangular slots 117 (as shown in FIGS. 1 and 6), the purpose of which will become apparent later herein, are formed in the guide rails 113 at generally equally spaced intervals along the length of the rails. Rubber sealing strips 119 depend from the guide rails 113 along the length of the rails in generally sealing engagement with the filtering belt 111 to inhibit treatment mixture on the belt from spreading transversely outward of the guide rails to the edge margins of the belt. The sealing strips 119 are releasably attached to the guide rails 113, such as by threaded fasteners (not shown) extending through the strips and through vertically oriented slots (not shown) in the guide rails so that the strips can be selectively positioned vertically relative to the guide rails. Thus it can be seen that the strips 119 may be lowered relative to the guide rails 113 as the strips become worn down due to friction between the strips and the filtering belt.

Referring again to FIGS. 1 and 2, a chute 121 extends transversely between the guide rails 113 generally at the upstream end 103 of the separation system 25 for receiving a stream of treatment mixture =exhausted from the feed tube 61. The chute 121 is constructed of stainless steel and has an upper end 123 attached to support arms (not shown) extending from the feed tank 23. The chute 123 inclines forward and downward to a lower end 125 disposed slightly above the filtering belt 111 to direct the mixture onto the belt. Tabs (not shown) extending from the sides of the chute 121 are attached to the guide rails 113, such as by welding, to further secure the chute against movement. A pair of fins 127 are mounted on the surface of the chute 121 in spaced relationship with each other, with the lower ends of the fins being flush with the lower end 125 of the chute. The fins 127 angle outward relative to the central axis of the separation system 25 as they extend down the chute 121 so that some of the mixture flowing down the chute is directed laterally outward by the fins to more evenly spread the mixture along the width of the belt 111 upon reaching the lower end 125 of the chute.

Figure 4:
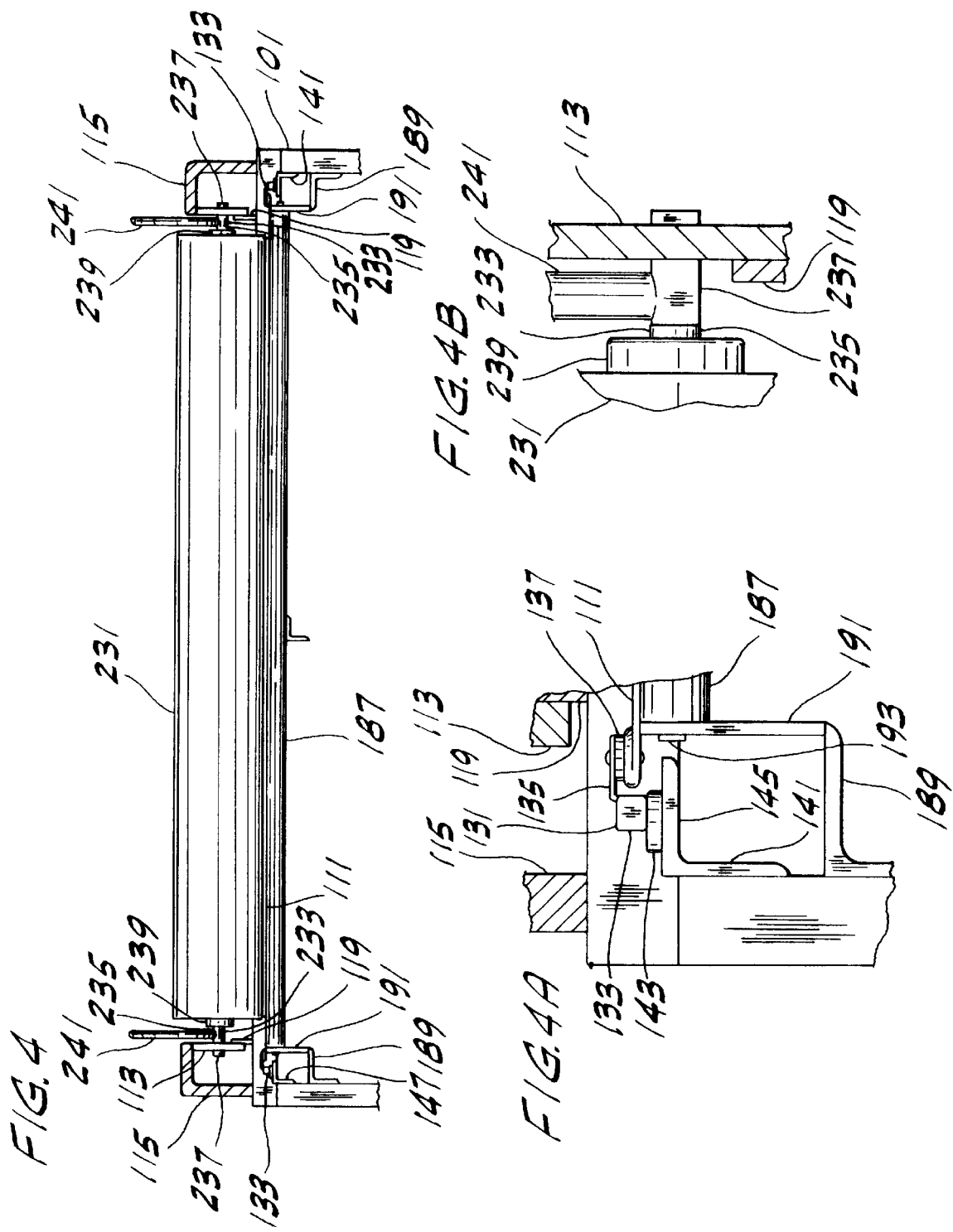
FIG. 4 is a section taken in the plane of line 4—4 of FIG. 1.

A pair of endless chains 131 comprised of interconnected links 133 (FIGS. 4 and 4a) are attached to respective edge margins of the filtering belt 111 for use in driving movement of the belt. A preferred attachment arrangement is disclosed in U.S. Pat. No. 4,081,375 (Deal et al.), which is incorporated herein by reference. Chain extensions 135 are attached to each of the links 133 of the chains 131 and extend inward over the edge margins of the filtering belt 111. An annular spacer 137 is positioned between each extension 135 and the filtering belt 111, and a rivet 139 secures the extension, spacer and belt together so that the chains 131 are secured to the belt. Angle irons 141 (one of which is shown in FIG. 4a) extend longitudinally between the upstream and downstream ends 103, 105 of the separation system 25 and are mounted to the separator frame 101 to define opposing support surfaces for supporting the upper reaches of the chains. Teflon wear strips 143 attached to the support surfaces of the angle irons 141, such as by screw fasteners 145, reduce friction between the chains and the angle irons.

A motor support frame 147 (seen best in FIG. 3) mounted on the upper rails 109 of the separator frame 101 at the downstream end 105 of the separation system 25 supports a motor 149 for driving the chains 131. The motor 149 is connected by way of a drive shaft 151 to a drive gear 153. A drive chain 155 extends downward from the drive gear 153 to a drive sprocket 157 mounted on a shaft 159 extending transversely outward from one side of the separator frame 101 at the downstream end 105 of the separation system 25. The driven shaft 159 further extends between the sides of the separator frame 101 and is journalled in the frame for rotation relative thereto. A chain idler 161 is rotatably connected to the separator frame 101 in contact with the drive chain 155 to maintain tension in the drive chain.

Figure 3:
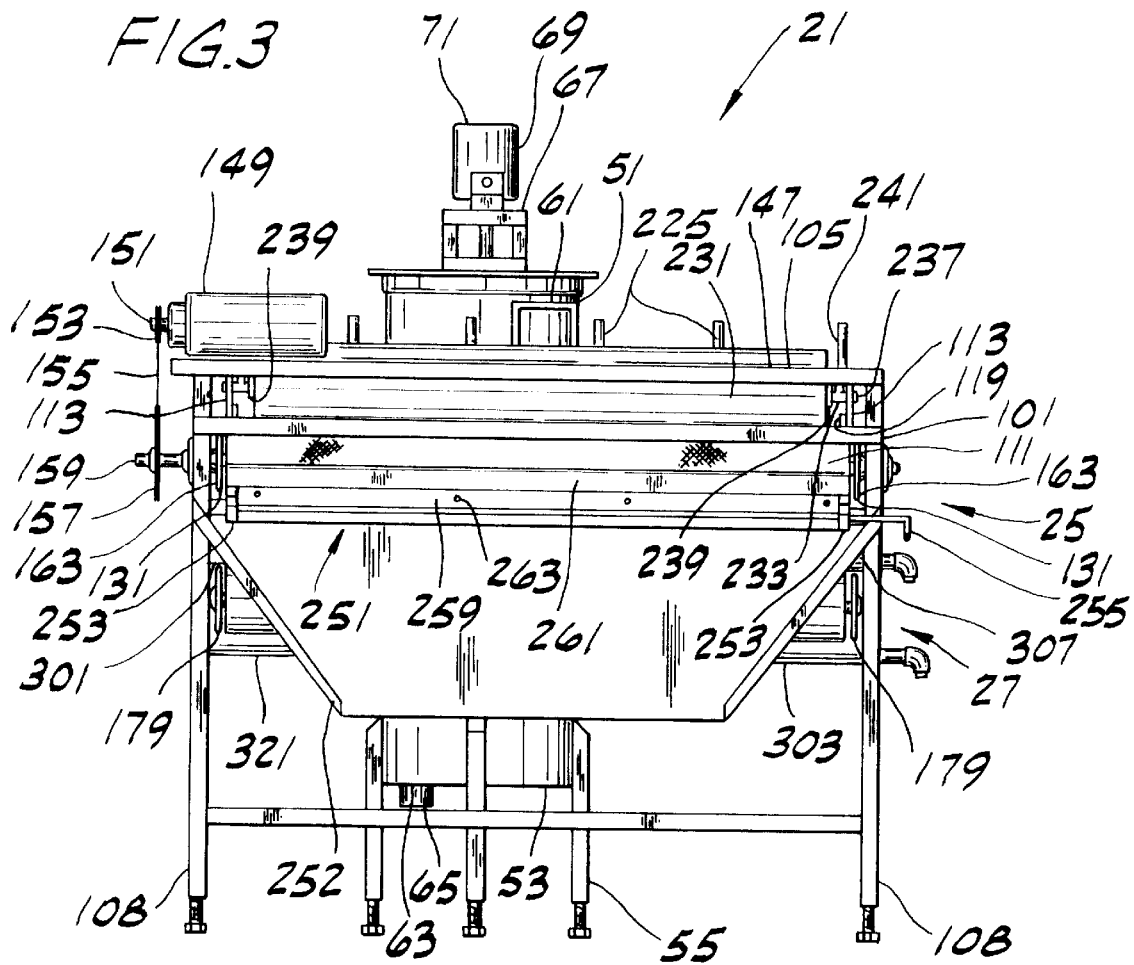
FIG. 3 is an end view of the apparatus of FIG. 1.

As illustrated in FIG. 3, a pair of driven sprockets 163 are mounted on the driven shaft 159 in spaced relationship with each other. The sprockets 163 are positioned between the upper rails 109 of the separator frame 101, with the spacing between the sprockets being slightly greater than the width of the filtering belt 111 so that the sprockets are aligned with the endless chains 131 at the edge margins of the belt. The teeth of the sprockets 163 are sized for meshing with the links 133 of the chains 131 for driving movement of the chains in a conventional manner upon rotation of the sprockets. Thus, it may be seen that the endless chains 131 are driven conjointly by the shaft 159 and sprockets 163 to move the upper reach of the belt 111 toward the downstream end 105 of the separation system 25. A support roller 165 having a length substantially equal to the width of the belt 111 is mounted on the driven shaft 159 for conjoint rotation therewith and extends between the sprockets 163 along substantially the entire width of the filtering belt to support the belt as the endless chains 131 are driven around the sprockets. The roller 165 has a rubber outer surface to maintain sufficient friction between the roller and the filtering belt 111 to inhibit slipping of the belt relative to the roller.

Tension sprockets 169 (FIG. 2) are mounted on another shaft 171 extending transversely between the sides of the separator frame 101 generally at the upstream end 103 of the separation system 25. The shaft 171 is journalled at its ends in mounting brackets 173 for rotation relative to the frame 101. A support roller 175 (shown in phantom in FIG. 1) is also mounted on the shaft 171 between the tension sprockets 169 for conjoint rotation therewith to support the belt 111 as the endless chains 131 are driven around the sprockets. The tension sprockets 169 and shaft 171 are preferably positioned in horizontal alignment with the driven sprockets 163 and shaft 159 so that the upper reach of the belt 111 is supported by the respective support rollers 165, 175 in a relatively horizontal orientation as the belt moves forward between the upstream and downstream ends 103, 105 of the separation system 25.

The mounting brackets 173 supporting the tension shaft 171 are connected to the separator frame 101 by threaded rods 177 (one of which is shown in FIG. 1) extending longitudinally between the brackets and the separator frame. Rotation of the threaded rod 177 relative to the frame 101 causes longitudinal movement of the brackets 173 relative to the frame such that the tension shaft 171 and sprockets 169 are moved longitudinally relative to the driven shaft 159 and sprockets 163. Movement of the tension shaft 171 away from the driven shaft 159 creates additional tension in the belt 111 to maintain the belt generally taut for inhibiting the belt from sagging and also for inhibiting the chains 131 against slipping off of the sprockets 163, 169. Movement toward the driven shaft 159 releases tension to permit removal of the belt 111 for replacement or repair.

Idler sprockets 179 (FIGS. 1 and 3) are mounted on an idler shaft 181 extending transversely between support brackets 183 depending from the lower rails 107 of the separator frame 101 intermediate the driven shaft 159 and the tension shaft 171. The idler shaft 181 is journalled at its ends for rotation relative to the frame 101. The idler sprockets 179 aid in controlling alignment and tracking of the belt 111 (e.g., to inhibit transverse movement of the belt). A support roller 185 is mounted on the idler shaft 181 for conjoint rotation therewith and extends between the idler sprockets 179 along substantially the entire width of the filtering belt 111 to maintain pressure against the belt as the endless chains 131 are driven around the sprockets 179.

In the illustrated embodiment, the endless chains 131, the motor 149 and associated shafts 159, 171, 181, sprockets 163, 169, 179 and rollers 165, 175, 185 broadly define a drive system for driving movement of the filtering belt 111.

The motor 149 preferably has sufficient power to drive the filtering belt 111 at speeds over 25 ft./min., up to about 50 ft./min.

Referring particularly to FIGS. 1 and 6, wiper bars 187 extend transversely beneath the upper reach of the filtering belt 111 in close contacting relationship with the belt. Contact between the bars 187 and the belt 111 breaks the surface tension of liquid suspended in the mesh of the upper reach of the belt to help the liquid fluid filter down through the belt. The wiper bars 187 are equally spaced, such as about 1.5 inches apart, substantially the entire distance between the support rollers 165, 175 at the upstream and downstream ends 103, 105 of the separation system 25. Longitudinally extending mounting brackets 189 are fastened to the inner surfaces of the upper rails 109 for supporting the wiper bars 187. As shown in FIG. 4a, the mounting brackets 189 are generally Z-shaped to define vertical mounting sections 191 spaced inward toward each other from the upper rails 109. The wiper bars 187 are preferably constructed of Teflon. The bars 187 of the illustrated embodiment are cylindrical, each having a diameter of about 1 inch. Extensions 193 projecting from the opposite ends of each wiper bar 187 are generally square in cross-section for seating respectively within squared notches (not shown) in the vertical mounting sections 191 of the mounting brackets 189 to secure the bars to the brackets.

A spreader plate 201 is positioned downstream of the lower end 125 of the chute 121 and extends transversely between the guide rails 113 above the belt 111. The spreader plate 201 is generally rectangular and is preferably constructed of stainless steel to withstand exposure to the high temperature of the treatment mixture carried by the filtering belt 111. The top edge of the plate 201 is attached along its length to a rod 203 extending transversely between the guide rails 113. The diameter of the rod 203 is sized for loosely seating within an opposing pair of the downwardly extending slots 117 in the guide rails 113 downstream of the lower end 125 of the chute 121 to secure the spreader plate 201 between the guide rails. A lower edge 205 of the spreader plate 201 rests on the filtering belt 111 and is slightly rounded to reduce the risk of damage to the filtering belt by the lower edge of the spreader plate. The ends of the rod 201 are capable of pivoting movement within the slots 117 of the guide rails 113 so that the rod and attached spreader plate 201 can be conjointly pivoted relative to the separator frame 101 and belt 111 about the rotation axis of the rod. Permitting free rotation of the rod 203 and spreader plate 201 inhibits excessive downward pressure applied by the plate against the filtering belt 111 to reduce wearing of the belt and inhibit excessive squeezing of the mixture against the belt as the mixture passes beneath the spreader plate.

Downstream of the spreader plate 201, a wedging unit, generally indicated at 211, extends transversely between the guide rails 113 in opposed relation with the filtering belt 111 for pressing or squeezing the mixture between the unit and the belt to further remove water and fatty components from the mixture. The wedging unit 211 is located sufficiently downstream of the spreader plate 201 so that water and liquified fatty components have already filtered down through the belt 111 for recovery by the recovery system 27 before the mixture approaches the wedging unit, resulting in a generally cake-like consistency of the mixture.

The wedging unit 211 includes opposing side walls 213, a horizontal top wall 215 and a bottom wall defining an inclined lower surface 217 of the wedging unit. The wedging unit 211 is oriented so that a lower end 219 of the inclined lower surface 217 is downstream of an upper end 221 of the surface and rests on the filtering belt to define a nip 212 between the wedging unit and the belt through which the mixture passes as the mixture is carried downstream by the belt. As an example, the wedging unit 211 illustrated in FIG. 6 is approximately 9 inches long and 4 inches high. The inclination angle α of the inclined lower surface 217 of the wedging unit 211 is preferably in the range of about 10°–30°. The wedge unit 211 of the illustrated embodiment is constructed of steel, with the inclined lower surface 217 of the wedging unit being lined with a rubber material (not shown) to prevent the metal surfaces of the wedging unit from contacting the filtering belt.

Figure 7:
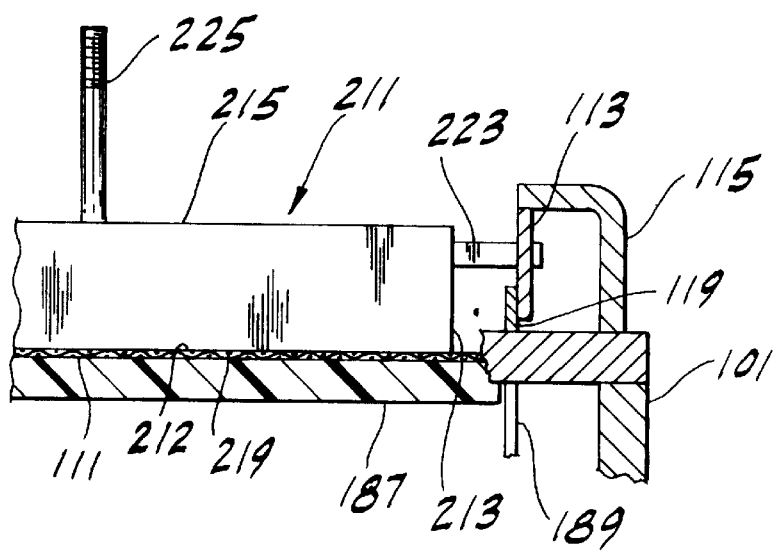
FIG. 7 is a fragmented section taken in the plane of line 7—7 of FIG. 6.

Extension members 223 (seen best in FIG. 7) are attached, such as by welding, to the side walls 213 of the wedging unit 211 and project laterally outward therefrom. The extension members 223 are generally square in cross-section and are sized for seating freely within the vertically extending slots 117 in the guide rails 113 to support the wedging unit 211 at the desired height above the filtering belt 111 and to secure the unit against longitudinal movement relative to the separator frame 101. The extension members 223 are capable of vertical movement within the slots 117, so that the wedging unit 211 can be moved vertically toward and away from the filtering belt 111. As such, the wedging unit 211 "floats" above the filtering belt 111 so that the downward pressure applied by the wedging unit 211 to the mixture is a function of the weight of the wedging unit.

When the mixture moves beneath the wedging unit 211, the mixture engages the inclined lower surface 217 of the wedging unit and is thus inhibited from moving further downstream. It has been found that the wedging unit 211 effectively breaks up the mixture, rolling portions of the mixture back over on itself. This reduces the thickness of the mixture and tends to spread the mixture more evenly along the width of the belt 111. The force of the moving mixture against the inclined lower surface 217 of the wedging unit 211 pushes the wedging unit upward against the weight of the wedging unit so that the mixture can pass through the nip 212 between the lower end 219 of the inclined surface and the filtering belt 111. As the mixture passes through the nip, the weight of the wedging unit 211 exerts a downward or squeezing pressure against the mixture to squeeze the mixture between the wedging unit and the filtering belt 111 to squeeze additional water and fatty components from the mixture for filtering through the belt and to reduce the thickness of the mixture. For example, after passing through the nip 212, the thickness of the mixture is preferably in the range of about 1/16 to 1/2 inches.

The weight of the wedging unit 211 must be such that the squeezing pressure exerted by the wedging unit against the mixture squeezes a desired amount of water and fatty components from the mixture, while still allowing the mixture to move the wedging unit away from the filtering belt so that the mixture can pass through the nip. An excessive downward pressure exerted by the wedging unit 211 would result in the mixture becoming dammed behind the nip 212, and would also result in particulate components of the mixture (i.e., solids) being mashed by the wedging unit down into the mesh of the filtering belt 111 such that the particulate components undesirably become entrained in the mesh. Vertically extending weight bars 225 are threadably mounted on the top of the wedging unit 211 in transversely spaced relationship between the guide rails 113 for receiving weights (not shown) thereon to adjust (e.g., increase) the downward squeezing pressure applied by the wedging unit to the mixture. The squeezing pressure exerted by the wedging unit 211 of the illustrated embodiment is preferably less than about 30 psi and is more typically about 0.25–1 psi.

Downstream of the wedging unit 211, a press roller 231 extends above the filtering belt 111 transversely across the width of the belt 111 to define a nip 232 between the press roller and the belt. The roller 231 is mounted on an axle 233 (FIGS. 4 and 4a) comprising a cylindrical center portion 235 and generally square end extensions 237. Bearings 239 are positioned on the axle 233 for rotatably mounting the roller 231 on the cylindrical center portion 235 of the axle so that the roller is capable of free rotation about a central longitudinal axis (not shown) of the axle. The end extensions 237 of the axle 233 are sized for seating freely within the vertically extending slots 117 in the guide rails 113, with the roller 231 resting on the filtering belt 111, to secure the roller against longitudinal movement relative to the belt and separator frame 101.

The extensions 237 are capable of vertical movement within the slots 117, so that the roller 231 can be moved vertically toward and away from the filtering belt 111. As such, the roller 231 "floats" above the filtering belt 111 in the same manner as the wedging unit 211 so that downward squeezing pressure applied by the press roller 231 to the mixture is a function of the weight of the press roller. Vertically extending weight bars 241 are attached to the squared end extensions 237 of the axle 233 for receiving weights (not shown) thereon to adjust (e.g., increase) the squeezing pressure applied by the roller against the mixture.

The roller 231 of the illustrated embodiment is preferably 6 inches in diameter so as to minimize the relative approach angle between the roller and the filtering belt 111. It has been found that a smaller relative approach angle inhibits the mixture from sticking to and wrapping around the roller 231 as the mixture passes through the nip between the roller and the belt 111. However, it is understood that the roller 231 may be sized smaller or larger than 6 inches in diameter without departing from the scope of this invention.

Now referring to FIGS. 1 and 3, a scraper unit, generally indicated at 251, extends transversely along the width of the filtering belt 111 at the downstream end 105 of the separation system 25 to scrape the remaining solids off of the belt for delivery to a receptacle (not shown) via a recovery chute 252 positioned adjacent the downstream end 105 of the system. The scraper unit 251 comprises a pair of mounting brackets 253 attached to the separator frame 101 beneath the driven support roller 165 and extending longitudinally outward from the frame. A support rod 255 extends transversely between the brackets 253 and is seated within slots 257 extending longitudinally within the brackets. A mounting plate 259 is attached to the rod 255, such as by welding, to extend generally upward from the rod. A scraper blade 261, preferably constructed of Teflon, is connected to the mounting plate 259 by suitable fasteners 263 in closely spaced relationship with the filtering belt 111 as the belt moves around the driven support roller 165.

The rod 255 is capable of sliding movement within 3 the slots 257 of the mounting brackets 253. In this manner, the angle of the scraper blade 261 relative to the filtering belt 111 can be adjusted by changing the position of the rod 255 within the slots 257 of the brackets 253. Suitable end nuts 265 releasably fix the rod 255 in its desired position. In the illustrated embodiment of FIG. 2, the rod 255 is bent at one end to a 900 angle to extend longitudinally inward of the scraper blade 261 for receiving weights thereon. It will be seen that weights may be loaded onto the bent end of the rod 255 to apply a torque to the scraper unit 251 to better hold the scraper blade 261 against the filtering belt 111.

The separation system 25 shown in the various figures herein includes a single wedging unit 211 disposed upstream of a single press roller 231. However, it is understood that the press roller 231 may be located upstream of the wedging unit 211 and remain within the scope of this invention. It has also been discovered that it is easier to squeeze water from the treatment mixture when the mixture is relatively thin as it passes beneath the wedging unit 211 and/or press roller 231. Where additional separation of water components is desired, it is contemplated that multiple wedging units 213 may be used, with the downward pressure exerted by the wedging units progressively increasing from the furthest upstream unit to the furthest downstream unit. Each of the wedging units 213 would be secured in a respective pair of the slots 117 in the guide rails 113. Multiple press rollers 231 may also be used in a manner similar to the multiple wedging units 211.

Also, for purposes herein, the wedging unit 211 and press roller 231 broadly comprise a press for applying a squeezing pressure to the mixture for squeezing the mixture against the filtering belt. It is contemplated, however, that the press may also comprise a single wedging unit by itself, a single press roller by itself, multiple wedging units, multiple roller units, or any combination of wedging units and roller units. The wedging unit 211 and press roller 231 are shown and described herein as resting on the filtering belt when no mixture is passing through the nips 212, 232. However, it is contemplated that the wedging unit 211 and press roller 231 may be mounted on the guide rails 113 such that the roller and the lower end 219 of the inclined surface 217 of the wedge unit are spaced an initial distance from the filtering belt, such as about $1/16$–$1/2$ inches, without departing from the scope of this invention.

In addition, the weights added to the wedging unit 211 and press roller 231 broadly comprise a biasing member for increasing the squeezing pressure applied by the press to the mixture as the mixture passes through the nips 212, 232. It is contemplated that biasing members other than weights may be used to increase the squeezing pressure applied by the wedging unit 211 and press roller 231 to the mixture, such as springs (not shown) that are sufficiently tensioned to inhibit the wedging unit and press roller against being pushed upward by the mixture, and remain within the scope of this invention.

Referring again to FIG. 1, the recovery system comprises upper and lower drain pans, respectively designated as 301 and 303, and a belt washer assembly, generally indicated at 305. The upper drain pan 301 extends longitudinally between the upstream and downstream ends 103, 105 of the separation system 25 and is attached to the lower rails 107 of the separator frame 101 beneath the upper reach of the filtering belt 111 for recovering substantially all of the water and fatty components passing through the upper reach of the filtering belt. The upper drain pan 301 is generally V-shaped so that liquid components recovered by the drain pan flow toward a central collection channel 307 extending transversely along the bottom of the drain pan. A suitable pipe (not shown) in fluid communication with the collection channel 307 receives the liquid components from the channel and carries the components to a clarifying station (not shown) where the recovered water and fatty components of the mixture may be separated in a conventional manner.

Figure 5:
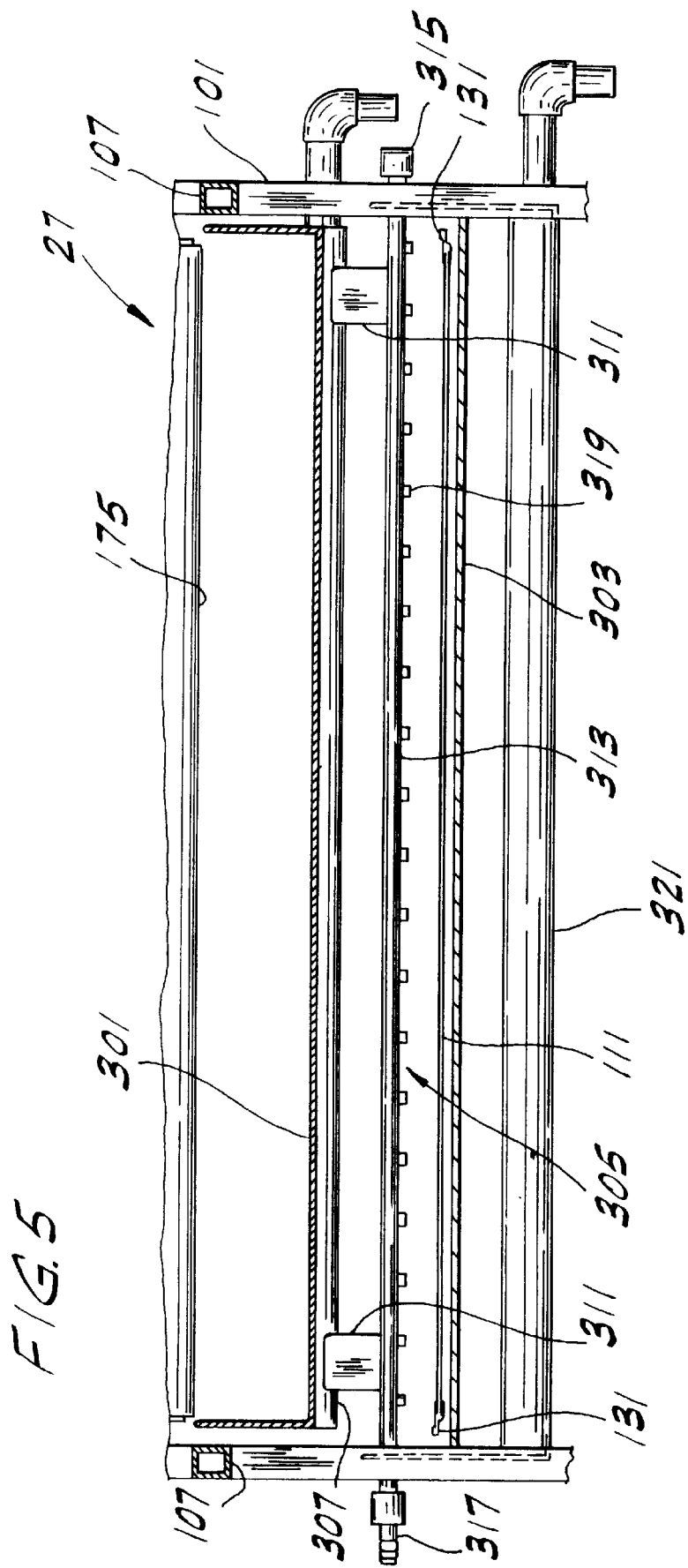
FIG. 5 is a section taken in the plane of line 5—5 of FIG. 1.

As shown in FIG. 5, the belt washer assembly 305 is secured by support brackets 311 connected to and depending from the bottom of the upper drain pan 301 for washing the lower reach of the filtering belt 111 as it returns from the downstream end 105 of the separation system 25 back to the upstream end 103. The washer assembly 305 includes a transversely extending pipe 313 having a length greater than the width of the filtering belt 111. One end of the pipe 313 is fitted with an end cap 315 while the other end is fitted with a nipple 317. The nipple 317 is adapted for connection, such as by suitable hosing (not shown) to a source of cleaning water (not shown). Spray nozzles 319 are fitted within openings (not shown) equally spaced along the length of the pipe 313 to direct pressurized water down against the lower reach of the filtering belt 111. The pressure of the water is preferably sufficient to dislodge any solids lodged in the mesh of the filtering belt 111.

The lower drain pan 303 is attached to the separator frame 101 beneath the lower reach of the filtering belt 111 for recovering cleaning water from the washer assembly 305 along with any solids (or treatment mixture components) washed from the filtering belt. As with the upper drain pan 301, the lower drain pan 303 is generally V-shaped so that the components recovered by the drain pan flows toward a central collection channel 321 extending transversely across the bottom of the drain pan. A suitable pipe (not shown) in fluid communication with the collection channel 321 receives the mixture of components from the channel and carries the mixture to the waste treatment station for reprocessing and further separation of the components.

Operation of the apparatus 21 of the present invention will now be described. Before activating the apparatus 21, the spreader plate 201, wedging unit 211 and press roller 231 are secured on the longitudinally extending guide rails 113 of the separator frame 101 at the desired positions between the upstream and downstream ends 103, 105 of the separation system 25 in the manner described above. Weights may be placed on the vertically extending weight bars 225, 241 of the wedging unit 211 and press roller 231 to adjust the downward pressure to be applied by the wedging unit and press roller against the mixture being processed. The conduit carrying the treatment mixture is connected to inlet port 57 of the feed tank 23. The treatment mixture in the conduit is at a temperature in the range of about 77° C.–99° C. so that the fatty components of the mixture are generally liquified.

The control panel is then used to activate the apparatus 21, turning on the filtering belt motor 149, the agitator motor 71 and the pumps associated with the treatment mixture. The filtering belt motor 149 drives rotation of the drive gear 153, thereby driving rotation of the drive sprocket 157 via the drive chain 155. The driven shaft 159 is rotated by the drive sprocket to drive rotation of the driven sprockets 163 about the rotation axis of the shaft. The teeth of the sprockets 163 mesh with the links 133 of the endless chains 131 attached to the filtering belt 111 to move the chains around the sprockets. The chains 131 are continuously driven by the motor 149 to drive the attached filtering belt 111 so that the upper reach of the belt moves continuously from the upstream end 103 of the separation system 25 to the downstream end 105.

The pumps associated with the treatment mixture pump the heated mixture through the conduit leading to the feed tank 23. The treatment mixture enters the feed tank 23 through the inlet port 57 adjacent the bottom wall 53 of the tank. The level of the treatment mixture within the tank 23 continues to rise as the mixture is pumped into the bottom of the tank. Pumping the mixture into the bottom of the tank tangential to the tank side wall 51 imparts a continuous upward swirling movement to the mixture already in the tank to inhibit stagnation of the mixture at the bottom of the tank. The agitator motor 71 drives rotation of the shaft 73 and propeller 75 so that once the level of the mixture reaches the propeller, the mixture is agitated by the propeller. Agitation of the treatment mixture inhibits settling of the solids present in the mixture and promotes the swirling or spiraling motion of the mixture as it rises within the tank 23.

When the feed tank 23 fills to the level of the outlet port 59, treatment mixture flows from the feed tank 23 via the outlet port and is carried by the feed tube 61 to the upstream end 103 of the separation system 25. Treatment mixture flows from the feed tube 61 down onto the chute 121 above the filtering belt 111. As the mixture flows forward and downward on the chute 121, the fins 127 on the chute spread the mixture outward so that the mixture is distributed more evenly along the width of I the belt upon reaching the lower end 125 of the chute.

Treatment mixture on the chute 121 flows down onto the moving filtering belt 111 and is carried by the belt toward the downstream end 105 of the separation system 25. The liquified components (i.e., the water and fatty components) of the mixture begin filtering down through the belt 111 and are recovered in the upper drain pan 301 beneath the belt for delivery to the clarifier. The wiper bars 187 in contact with the underside of the filtering belt 111 break the surface tension of liquid components in the mesh of the belt to promote passing of these components down through the belt to the upper drain pan 301. As mixture approaches the spreader plate 201 downstream of the chute 121, the plate is lifted by the mixture so that the mixture can pass downstream of the plate. Some of the mixture begins to dam behind the plate 201 and tends to move laterally along the width of the belt 111 to areas where the mixture is less thick, thereby more uniformly distributing the mixture along the width of the belt.

When the mixture reaches the wedging unit 211 downstream of the spreader plate 201, a sufficient amount of liquid components have been filtered out of the mixture so that the remaining protein and liquid components have a cake-like consistency. The inclined lower surface 217 of the wedging unit 211 resists forward movement of the mixture and acts to compact or squeeze the mixture against the filtering belt 111. More particularly, the inclined surface 217 pushes portions of the mixture backward, such that the mixture tends to churn, or roll backward onto additional incoming mixture. The churning or agitating action tends to work additional water and fatty components from the mixture for filtering through the belt 111, and also promotes tumbling of the mixture to areas of less thickness, thereby spreading the mixture more uniformly along the width of the filtering belt for further processing of the mixture.

As the mixture engages the inclined lower surface 217 of the wedging unit 211, the force of the forward moving mixture against the inclined surface increases. The floating arrangement of the wedging unit 211 allows the wedging unit to be lifted by the mixture away from the filtering belt so that the mixture can pass through the nip 212. The squeezing pressure exerted by the wedging unit 211 resists the upward lifting by the mixture and squeezes the mixture between the lower end 219 of the inclined surface 217 and the filtering belt 111 to promote the further squeezing of water and fatty components from the mixture for filtering through the belt 111.

The mixture is then carried further downstream by the filtering belt 111 to the press roller 231 where the mixture is further squeezed to remove additional water and fatty components. As with the wedging unit 211, when the mixture engages the press roller 231, an upward pressure is applied by the mixture to the roller. The floating arrangement of the press roller 231 allows it to be lifted by the mixture so that the mixture can pass through the nip 232 and be carried further downstream by the belt 111. The squeezing pressure exerted by the press roller 231 squeezes the mixture between the roller and the filtering belt 111.

Upon reaching the downstream end 105 of the separation system 25, solids remaining on the filtering belt 111 engages the scraper blade 261 as the belt and chains 131 move around the driven sprockets 163 and associated support roller 165. The scraper blade 261 removes the solids from the belt so that the mixture falls onto the recovery chute 252 for delivery into the receptacle. Any solids or treatment mixture components adhering to or remaining enmeshed in the belt 111 after scraping are carried by the lower reach of the belt beneath the washer assembly 305 above the lower drain pan 303. The remaining solids or components are washed from the filtering belt 111 and recovered by the lower drain pan 202 for delivery back to the waste treatment system to be reprocessed.

It will be observed from the foregoing that the apparatus 21 and process described herein satisfies the various objectives of the present invention and attains other advantageous results. Constructing the filtering belt 111 of stainless steel inhibits the belt from deforming due to the high temperatures (e.g., in the range of about 77° C.–99° C., or about 170° F.–200° F.) of the treatment mixture. Thus, the apparatus 21 is capable of processing a heated treatment mixture in which the fatty components of the mixture are generally liquified.

Importantly, mounting the wedging unit 211 and press roller 231 on the guide rails 113 for floating movement toward and away from the filtering belt prevents excessive squeezing pressure from being applied to the mixture so that solids are not mashed into and entrained in the mesh of the filtering belt 111. As such, the belt 111 requires little cleaning after the solids have been scraped off at the downstream end 105 of the separation system 25. More particularly, it has been found that the amount of cleaning water used by the washer assembly 305 to sufficiently clean the filtering belt 111 may be less than or equal to about 10 gallons per minute. Moreover, the filtering belt is cleaned intermittently or on an as needed basis, so that the 10 gallons per minute rate of cleaning water usage occurs for only about 1–5 minutes per hour. This is a substantial reduction in water usage over the 40 gallons per minute, continuous usage associated with conventional separating apparatus to process a similar volume of mixture. Since the cleaning water must be recovered and sent back to the waste treatment system for reprocessing, the reduction in cleaning water usage directly results in a reduction of processing costs.

Also, because the fatty components are generally liquified, a substantial amount of water and fatty components are separated from the mixture prior to squeezing of the mixture by the wedging unit 211 and press roller 231. In addition, less pressure is needed by the wedging unit 211 and press roller 231 to squeeze additional water and fatty components from the mixture. However, even without applying substantial squeezing pressure to the mixture, it has been found that at least about 75% of the water components of the initial treatment mixture can be separated from the mixture by the present apparatus; that is, the protein component product will typically have at least about a 25% solids content. Thus, only a single filtering belt 111 is needed (as opposed to the twin belts employed by conventional apparatus) along with the longitudinally stationed wedging unit 231 and press roller 231 to adequately separate the water and fatty components from the mixture. A large number of compression rollers, as well as the complicated compression roller pattern, is no longer required, resulting in a reduced cost to manufacture and maintain the apparatus 21.

The less complicated design of the apparatus 21 and the ability of the filtering belt 111 to maintain dimensional stability of the belt mesh upon exposure to the high temperatures of the treatment mixture also allow the filtering belt to be driven at higher speeds, such as about 25 ft/min. or more, and particularly up to about 50–60 ft/min. This results in greater processing capabilities.

While the above apparatus and process are described herein in relation to the separation of water and liquified fatty components from a treatment mixture that also includes proteinaceous solids, it is to be understood that the apparatus and process may be used for processing any mixture comprised of liquid components and particulate components and remain within the scope of this invention.

As various changes could be made in the above constructions without departing from the scope of the invention, it is intended that all matter contained in the above description or shown in the accompanying drawings shall be interpreted as illustrative and not in a limiting sense.

The process of the present invention is further illustrated by the following Examples. These Examples are designed to teach those of ordinary skill in the art how to practice this invention. These Examples, however, are not to be interpreted in a limiting sense.

EXAMPLE 1

A quantity of animal fat (i.e., the carrier material) is heated using steam in a jacketed vessel until the temperature of the liquefied animal fat is within the range of 77–88° C. (170–190° F.). The liquefied animal fat is then pumped into a mixer equipped with a stirring mechanism. Simultaneously, the float material produced by a waste water treatment system at a food processing plant is introduced into the mixer.

The heated carrier material and float material are mixed for approximately 30 minutes until a treatment mixture is obtained. The mixture is then pumped into a shaker screen apparatus having 3 concentric screen sections of 80 (top), 120 (middle), and 150 (bottom) mesh sizes. The screens permit the water and fatty components of the mixture to pass through. These components are then discharged through an opening located at the bottom of the apparatus.

The screen sizes are selected so that the protein component will not pass through in any substantial amount but, instead, will be screened and discharged from the apparatus through openings located immediately after each screen but before the next screen or bottom opening. The protein component, which is collected from the apparatus and then transported to a rendering plant, has a solids content of about 30 to 40 percent by weight.

The liquid mixture which remains after being discharged from the bottom of the shaker screen apparatus is primarily comprised of a fatty component product phase and a water component product phase. This mixture is transferred to a clarifier apparatus, which is rectangular and has 2 compartments separated by a baffle. This mixture is transferred into a first compartment after which the water component phase, being heavier than the fatty component phase, begins to sink toward the bottom. As additional liquid mixture from the shaker screen apparatus is introduced into the first compartment, the level rises toward the top of the baffle. When the level reaches the top of the baffle, the lighter fatty component product phase spills over into the second compartment. The fatty component product, which has a moisture content of less than about a 2 percent by weight, is discharged from the second compartment and can be recycled into this process or transported to a rendering process.

To maintain the proper level in the first compartment, the water component phase is discharged from the bottom of the first compartment. This component phase can be further treated, as necessary, before discharging into a municipal sewer or using in other applications.

EXAMPLE 2

Approximately 3 liters of a treatment mixture comprising about 90 weight percent water, i.e., having a solids content about 10 weight percent, was pumped into a plug flow reactor. The reactor comprised a stainless steel pipe having a diameter of about 0.5 inches and a lenght of about 65 feet. Heat was supplied to the treatment mixture externally by immersing the stainless steel pipe in an oil bath heated to a temperature of about 88° C. (190° F.).

The treatment mixture was recirculated within the pipe for about 10 minutes to allow for the temperature to increase to about 85° C. (185° F.), and then recirculation was maintained for an additional 20 minutes in order to complete the heating cycle. About 1 liter of the treatment mixture was then mixed with about 25 mL of a 2 percent, by weight, suspension containing a cationic polymer flocculating agent. After gentle mixing, the flocculated mixture was gravity filtered through Whatman #1 filter paper. The collected material, i.e., the protein component product, contained about 31 weight percent proteinaceous solids and about 53 weight percent fats, oils, and greases, on a dry weight basis.

What is claimed is:

1. A process for the treatment of a float material comprising a protein component, a fatty component and a water component, the process comprising:

forming a hot treatment mixture by mixing a carrier material and the float material, the mixture having a solids content ranging from about 2 to about 20 weight percent, the mixture being heated to a temperature sufficient to liquefy fats, oils and greases which are present;

adding a flocculating agent to the hot treatment mixture to form a flocculated mixture; and, separating the flocculated mixture into a protein product, a fatty product and a water product.

2. The process as set forth in claim 1 wherein the carrier material is aqueous or a natural oil.

3. The process as set forth in claim 2 wherein the natural oil is selected from the group consisting of vegetable oil, animal fat, fish oil, and mixtures thereof.

4. The process as set forth in claim 3 wherein the natural oil contains at least about 90 weight percent animal fat.

5. The process as set forth in claim 3 wherein the natural oil contains at least about 95 weight percent animal fat.

6. The process as set forth in claim 2 wherein the aqueous carrier material comprises at least about 80 weight percent liquid water.

7. The process as set forth in claim 6 wherein the aqueous carrier material additionally comprises less than about 1 weight percent fat.

8. The process as set forth in claim 6 wherein the aqueous carrier material comprises less than about 1000 mg/liter of total suspended solids.

9. The process as set forth in claim 6 wherein the aqueous carrier material comprises less than about 5000 mg/liter of BOD.

10. The process as set forth in claim 1 wherein the treatment mixture has a combined content of proteinaceous solids, fats, oils and greases which ranges from about 4 weight percent to about 10 weight percent.

11. The process as set forth in claim 1 wherein separation of the protein product is achieved by means of filtration.

12. The process as set forth in claim 11 wherein filtration occurs while the temperature of the treatment mixture ranges from about 77° C. to about 93° C.

13. The process as set forth in claim 12 wherein filtration is achieved by means of a belt filter, said belt filter comprising a mesh material which is capable of maintaining dimensional stability of the mesh openings and which is substantially corrosion resistant when exposed to the hot treatment mixture.

14. The process as set forth in claim 1 wherein the flocculating agent is selected from the group consisting of cationic agents, anionic agents and mixtures thereof.

15. The process as set forth in claim 14 wherein the flocculating agent is cationic, said cationic agent selected from the group consisting of polyamines or polyammonium salts.

16. The process as set forth in claim 14 wherein said flocculating agent is a polyacrylamide anionic flocculating agent.

17. The process as set forth in claim 14 wherein about 25 ppm to about 125 ppm of the flocculating agent is added to the treatment mixture.

18. The process as set forth in claim 1 wherein the float material is obtained from a dissolved air flotation waste water treatment system.

19. The process as set forth in claim 18 wherein the float material has a pH which ranges from about 4 to about 8.

20. The process as set forth in claim 1 wherein the float material contains an antioxidant.

21. The process as set forth in claim 20 wherein the float material has an antioxidant concentration ranging from about 1 pound to about 4 pounds per ton of solids present in the float material.

22. The process as set forth in claim 20 wherein the float material has an antioxidant concentration ranging from about 0.05 to about 0.2 weight percent, as determined based on the weight of solids present in the float material.

23. The process as set forth in claim 20 wherein the antioxidant is selected from the group consisting of ethoxyquin, tetrabutylhydroquinone, 2,6-di-tert-butyl-4-methylphenol, 2-tert-butyl-4-methoxyphenol, 3-tert-butyl-4-methoxyphenol, and mixtures thereof.

24. The process as set forth in claim 20 wherein the fatty product has a peroxide content which does not exceed the initial peroxide content of the float material by more than about 20 meq/kg fat.

25. The process as set forth in claim 20 wherein the fatty product has a peroxide content which is about equal to the initial peroxide content in the float material.

26. The process as set forth in claim 20 wherein the fatty product has an antioxidant concentration ranging from about 200 ppm to about 1250 ppm.

27. The fatty product of the process of claim 20.

28. The process as set forth in claim 1 wherein the treatment mixture is maintained at a temperature between about 77° C. and about 93° C. for at least about 20 minutes.

29. The process as set forth in claim 28 wherein the protein product has a gram negative plate count which is less than about 10 cfu/g.

30. The process as set forth in claim 28 wherein the protein product has a gram negative plate count which is less than about 5 cfu/g.

31. The process as set forth in claim 28 wherein the fatty component product has a gram negative plate count which is less than about 10 cfu/g.

32. The protein product of the process of claim 28.

33. The process as set forth in claim 1 wherein the protein product comprises proteinaceous solids, fats, oils and greases, the protein product having a ratio of proteinaceous solids to the sum of fats, oils and greases ranging from about 1:1 to about 2:1.

34. The process as set forth in claim 1 wherein the protein product has a combined content of proteinaceous solids, fats, oils and greases of at least about 25 weight percent.

35. The process as set forth in claim 1 wherein the protein product has a combined content of proteinaceous solids, fats, oils and greases of at least about 30 weight percent.

36. The process as set forth in claim 1 wherein the fatty component product has a free fatty acid content which exceeds the initial free fatty acid content in the float material by not more than about 10 weight percent, as determined based on the fat content of the sample.

37. A process for the recovery of a protein product and a fatty product from waste water comprising a protein component, a fatty component and a water component, the process comprising:

aerating said waste water in a flotation zone in the presence of a flocculating agent to produce a float material at an upper surface of an underlying waste water phase, said float material comprising said protein component, fatty component and water component;

separating said float material from the underlying waste water phase;

forming a stabilized mixture comprising said float material and an antioxidant;

forming a treatment mixture comprising said stabilized mixture and a carrier material, said treatment mixture being heated to a temperature of less than about 99° C.; and, separating the treatment mixture into a protein product, a fatty product and a water product.

38. The process as set forth in claim 37 wherein the float material has an antioxidant concentration ranging from about 0.5 pound to about 20 pounds per ton of solids present in the float material.

39. The process as set forth in claim 38 wherein the float material has an antioxidant concentration ranging from about 1 pound to about 4 pounds per ton of solids present in the float material.

40. The process as set forth in claim 37 wherein the float material has an antioxidant concentration ranging from about 0.02 to about 1 weight percent, as determined based on the weight of solids present in the float material.

41. The process as set forth in claim 40 wherein the float material has an antioxidant concentration ranging from about 0.05 to about 0.2 weight percent, as determined based on the weight of solids present in the float material.

42. The process as set forth in claim 37 wherein the antioxidant is selected from the group consisting of ethoxyquin, tetrabutylhydroquinone, 2,6-di-tert-butyl-4-methylphenol, 2-tert-butyl-4-methoxyphenol, 3-tert-butyl-4-methoxyphenol, and mixtures thereof.

43. The process as set forth in claim 37 wherein the fatty product has a peroxide content which does not exceed the initial peroxide content of the float material by more than about 20 meq/kg fat.

44. The process as set forth in claim 37 wherein the fatty product has a peroxide content which is about equal to the initial peroxide content in the float material.

45. The process as set forth in claim 37 wherein the fatty product has an antioxidant concentration ranging from about 200 ppm to about 1250 ppm.

46. The fatty product of the process of claim 37.

47. A process for the treatment of a float material composing a protein component, a fatty component and a water component, the process comprising:

forming a hot treatment mixture by mixing a carrier material and the float material, the temperature of said hot mixture ranging from about 77° C. to about 93° C.; and, separating the hot mixture into a protein component product, a fatty component product and a water component product, wherein separating the hot mixture is achieved by feeding the hot mixture onto a belt filter, said belt filter comprising a non-corroding, non-deforming mesh belt.

48. The process of claim 47 wherein separating the hot treatment mixture further comprises:

feeding the treatment mixture onto an endless belt filter of a separation system, the belt filter having a mesh sized selected to permit the water and fatty component products to filter down through the belt while retaining protein component product thereon;

moving the belt generally in a circuit between an upstream end of the separation system and a downstream end of the system as water and fatty component products are separated from the mixture by filtering through the belt; and, passing an unfiltered mixture carried by the belt beneath a press means generally between the upstream and downstream ends of the separation system, said press means being capable of applying a downward pressure against the unfiltered mixture to squeeze the unfiltered mixture between the press means and the filtering belt to separate water and fatty component products from the unfiltered mixture through the belt, said press means being capable of vertical movement relative to the belt so that in the event the unfiltered mixture becomes dammed between the press means and the belt, said press means is pushed upward by the unfiltered mixture relative to the belt to allow the unfiltered mixture to pass downstream of the press means substantially without being mashed into the filtering belt by the downward pressure of the press means.

49. The process of claim 48 wherein separating the hot treatment mixture further comprises:

recovering a liquid mixture comprising the water and fatty components filtered through the filtering belt for delivery to a clarifier for further separation of the water and fatty components;

scraping the unfiltered mixture remaining on the belt at the downstream end of the apparatus off of the belt to recover the protein component product of the treatment mixture;

moving the belt past a washer assembly as the belt returns to the upstream end of the apparatus whereby pressurized cleaning water is directed at the belt to remove any waste mixture entrained in the belt; and recovering the cleaning water and waste mixture removed from the belt for delivery to the waste treatment system for reprocessing.

50. The process of claim 49 wherein the washer assembly expends cleaning water at a flow rate of less than or equal to about 10 gallons per minute.

51. The process of claim 48 wherein the belt is driven at a speed greater than about 25 feet per minute.

52. The process of claim 48 wherein the belt is driven at a speed of about 50 feet per minute.

53. The process of claim 47 wherein the protein component product has a combined content of proteinaceous solids, fats, oils and greases of at least about 25 weight percent.

54. The process of claim 47 wherein the protein component product comprises proteinaceous solids, fats, oils and greases, the protein product having a ratio of proteinaceous solids to the sum of fats, oils and greases ranging from about 1:1 to about 2:1.

55. The process of claim 47 wherein the fatty component product has a water content which is less than about 4 weight percent.

56. A process for the treatment of a float material comprising a protein component, a fatty component and a water component, the process comprising:

forming a treatment mixture by mixing a carrier material and the float material, the treatment mixture being heated to a temperature which is sufficient to liquefy fats, oils and greases which are present;

passing the treatment mixture through a plug flow reactor; and, separating the flocculated mixture into a protein product, a fatty product and a water product.

57. The process as set forth in claim 56 wherein the temperature of the treatment mixture is maintained within the range of about 77° C. to about 93° C. as it passes through the plug flow reactor.

58. The process as set forth in claim 57 wherein the treatment mixture has a residence time within the plug flow reactor of at least about 20 minutes.

59. The process as set forth in claim 58 wherein the protein product has a gram negative plate count which is less than about 10 cfu/g.

60. The process as set forth in claim 58 wherein the fatty component product has a gram negative plate count which is less than about 10 cfu/g.

\* \* \* \* \*